US012515144B2

(12) United States Patent
Anderson

(10) Patent No.: US 12,515,144 B2
(45) Date of Patent: Jan. 6, 2026

(54) WHEELCHAIR ACCESSIBLE SEATING LOCATIONS WITHIN A VENUE

(71) Applicant: Sphere Entertainment Group, LLC, New York, NY (US)

(72) Inventor: Robert Kenneth Anderson, Levittown, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 344 days.

(21) Appl. No.: 18/311,437

(22) Filed: May 3, 2023

(65) Prior Publication Data

US 2023/0271101 A1    Aug. 31, 2023

Related U.S. Application Data

(63) Continuation of application No. 17/339,281, filed on Jun. 4, 2021, now Pat. No. 11,679,337.

(51) Int. Cl.
*A63J 5/00*    (2006.01)
*A61G 99/00*    (2006.01)
*H04R 3/14*    (2006.01)

(52) U.S. Cl.
CPC ................ *A63J 5/00* (2013.01); *A61G 99/00* (2013.01); *A63J 2005/003* (2013.01); *H04R 3/14* (2013.01)

(58) Field of Classification Search
None
See application file for complete search history.

(56) References Cited

U.S. PATENT DOCUMENTS 5,192,247 A    3/1993    Barr et al.
5,581,057 A    12/1996    Ferrario et al.
(Continued)

FOREIGN PATENT DOCUMENTS

EP    0665181 A1    8/1995
KR    20170073946 A  *  6/2017 .............. A63J 25/00
(Continued)

OTHER PUBLICATIONS

International Search Report and Written Opinion of the International Searching Authority, directed to related International Patent Application No. PCT/US2023/079197, mailed Feb. 9, 2024; 79 pages.

(Continued)

*Primary Examiner* — Dorothy Harris
(74) *Attorney, Agent, or Firm* — Sterne, Kessler, Goldstein & Fox P.L.L.C.

(57)    ABSTRACT

The wheelchair accessible seating locations provide new immersive experiences to people using wheelchairs in viewing an event at a venue while being ADA-compliant. These wheelchair accessible seating locations can be moved along one or more principal axes, such as the x-axis, the y-axis, and/or the z-axis of the Cartesian coordinate system to provide some examples, as the people using wheelchairs is viewing the event. These wheelchair accessible seating locations can oscillate along the one or more principal axes to generate vibrations to create the experience of touch to the people using wheelchairs to provide these new immersive experiences to the people using wheelchairs in viewing the event. These movements of the wheelchair accessible seating locations can coincide with, for example, be synchronized to, the event to provide the people using wheelchairs with a substantially similar immersive experience as other (Continued)

Figure 1:
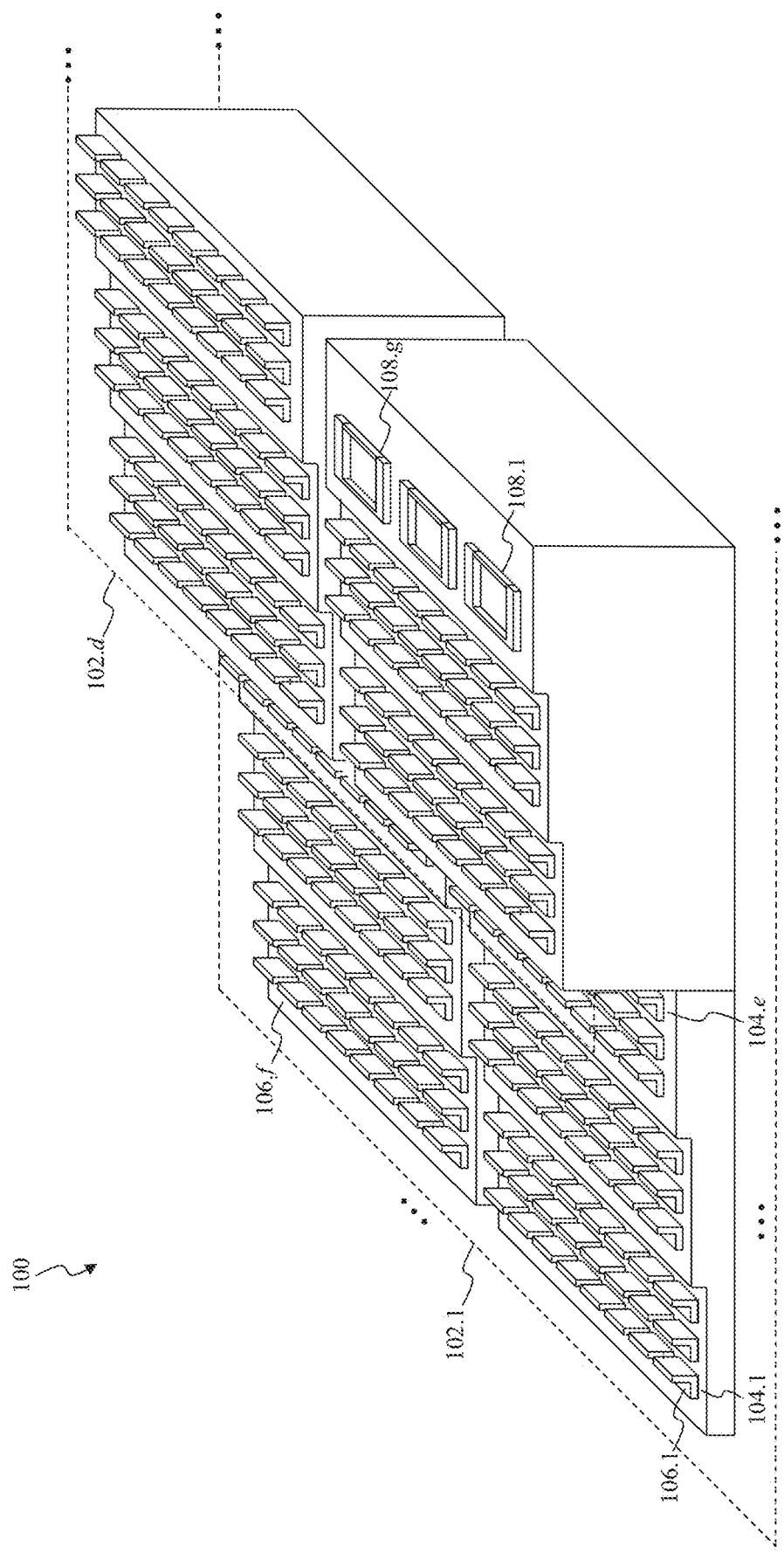

spectators of the event that are seated in the seats within the venue.

20 Claims, 14 Drawing Sheets

(56) References Cited

U.S. PATENT DOCUMENTS

| | | | |
|---|---|---|---|
| 5,829,201 A * | 11/1998 | Schelter | ............... A63J 5/00 |
| | | | 472/60 |
| 6,428,419 B1 | 8/2002 | Sheldon | |
| 6,517,443 B1 | 2/2003 | Villella | |
| 7,553,288 B2 | 6/2009 | Cohen | |
| 7,918,308 B2 | 4/2011 | Cohen | |
| 9,510,164 B2 | 11/2016 | Heubel | |
| 9,586,151 B1 | 3/2017 | Boyle | |
| 10,192,340 B2 | 1/2019 | Gutierrez et al. | |
| 10,621,784 B2 | 4/2020 | Khan et al. | |
| 11,229,787 B2 | 1/2022 | Daniels et al. | |
| 11,564,854 B2 | 1/2023 | Cooper | |
| 11,679,337 B2 | 6/2023 | Anderson | |
| 2004/0223622 A1* | 11/2004 | Lindemann | ............ H04R 5/04 |
| | | | 381/79 |
| 2005/0053252 A1 | 3/2005 | Cohen | |
| 2006/0284459 A1 | 12/2006 | Real et al. | |
| 2007/0205646 A1 | 9/2007 | Bapst et al. | |
| 2009/0189424 A1 | 7/2009 | Chi | |
| 2010/0205867 A1* | 8/2010 | Park | ............... A47C 1/12 |
| | | | 297/217.4 |
| 2011/0102161 A1 | 5/2011 | Heubel | |
| 2013/0270880 A1 | 10/2013 | Lee | |
| 2018/0144525 A1 | 5/2018 | Gutierrez et al. | |
| 2018/0311587 A1 | 11/2018 | Freedman et al. | |
| 2019/0102941 A1 | 4/2019 | Khan et al. | |
| 2020/0063381 A1 | 2/2020 | Trilling | |
| 2020/0097088 A1 | 3/2020 | Welch | |
| 2020/0236488 A1* | 7/2020 | Bharitkar | ............... H04S 5/00 |
| 2020/0237586 A1 | 7/2020 | Choi | |
| 2020/0237591 A1 | 7/2020 | Choi | |
| 2020/0353239 A1 | 11/2020 | Daniels et al. | |
| 2022/0202190 A1* | 6/2022 | Sim | ............... H04R 1/028 |
| 2022/0287894 A1 | 9/2022 | Suzuki et al. | |
| 2022/0331177 A1 | 10/2022 | Guo | |
| 2022/0387903 A1 | 12/2022 | Anderson | |
| 2023/0039530 A1 | 2/2023 | Resnick et al. | |
| 2023/0125250 A1 | 4/2023 | Hiromi | |
| 2023/0186781 A1 | 6/2023 | Kim et al. | |
| 2023/0271101 A1 | 8/2023 | Anderson | |
| 2024/0051815 A1* | 2/2024 | Getman | ............... A61H 23/02 |
| 2024/0168555 A1 | 5/2024 | Anderson | |

FOREIGN PATENT DOCUMENTS

| | | |
|---|---|---|
| KR | 102182098 B1 | 12/2020 |
| WO | WO 2016086235 A1 | 6/2016 |

OTHER PUBLICATIONS

International Search Report and Written Opinion of the International Searching Authority, directed to related International Patent Application No. PCT/US2023/075428, mailed Jun. 20, 2024; 15 pages.

* cited by examiner

WHEELCHAIR ACCESSIBLE SEATING LOCATIONS WITHIN A VENUE

CROSS-REFERENCE TO RELATED APPLICATIONS

The present application is a continuation of U.S. patent application Ser. No. 17/339,281, filed Jun. 4, 2021, now U.S. Pat. No. 11,679,337, which is incorporated herein by reference in its entirety.

BACKGROUND

The Americans with Disabilities Act (ADA) is a civil rights law that prohibits discrimination based on disability. Title III of the ADA is directed toward public accommodations and commercial facilities. Under this title, "[n]o individual shall be discriminated against on the basis of disability in the full and equal enjoyment of the goods, services, facilities, privileges, advantages, or accommodations of any place of public accommodation by any person who owns, leases (or leases to), or operates a place of public accommodation." Public accommodations, under the ADA, include "a motion picture house, theater, concert hall, stadium, or other place of exhibition or entertainment" and "an auditorium, convention center, lecture hall, or other place of public gathering." The ADA requires new public accommodations to be accessible to people with disabilities so they, their families, and friends can enjoy equal access to entertainment, recreation, and leisure.

To be ADA-compliant, public accommodations are required to have wheelchair accessible seating with at least one percent of the seating is to be wheelchair seating locations. The wheelchair seating locations are to provide lines of sight comparable to those provided to other spectators. These wheelchair seating locations are is to be open, level spaces that accommodate people using wheelchairs and have smooth, stable, and slip-resistant surfaces. These wheelchair seating locations are to be an integral part of the seating plan so that people using wheelchairs are not isolated from other spectators or their friends or family. Moreover, companion seats are to be provided next to the wheelchair seating locations to accommodate friend or companion of the people using wheelchairs. The wheelchair seating locations are to be provided in all areas including sky boxes and specialty areas. And, whenever more than three hundred (300) seats are provided, wheelchair seating locations are to be provided in more than one location to provide choices of admission prices and views comparable to those for the general public. The wheelchair seating locations are to be on accessible routes that provide access from parking and transportation areas and that connects to all public areas, including concessions, restaurants, rest rooms, public telephones, and exits.

BRIEF DESCRIPTION OF THE DRAWINGS/FIGURES

Figure 3A:
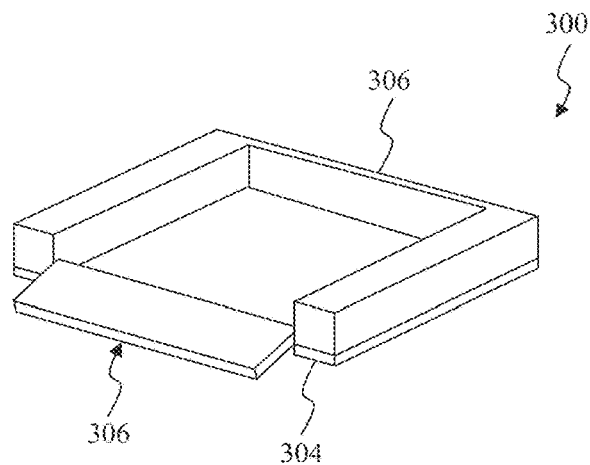
Figure 3B:
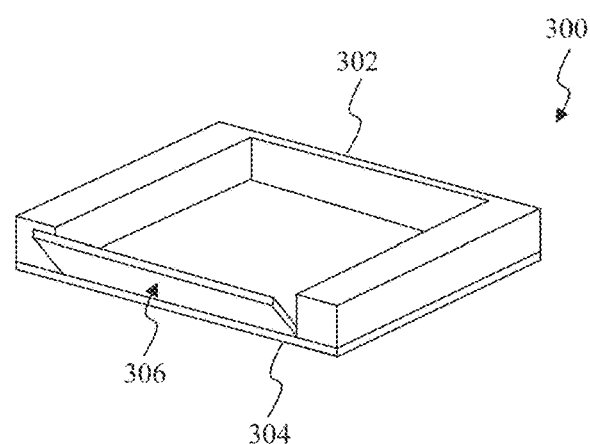
Figure 3C:
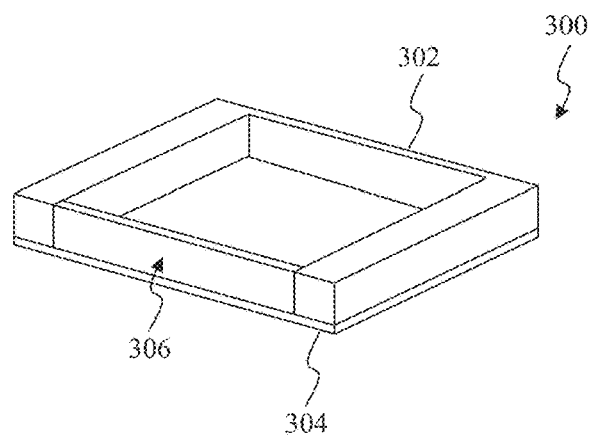
Figure 4A:
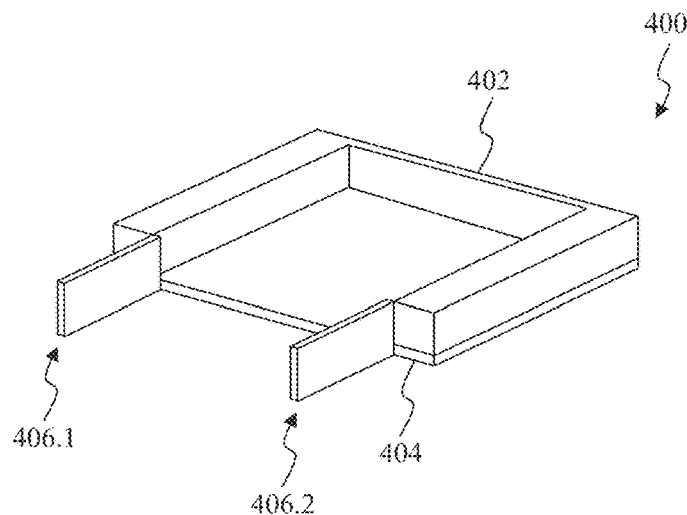
Figure 4B:
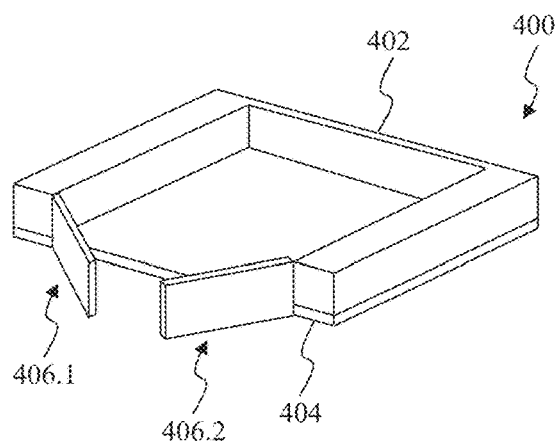
Figure 4C:
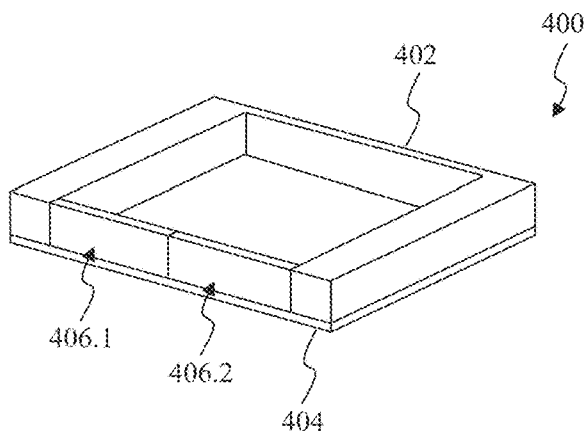
Figure 5:
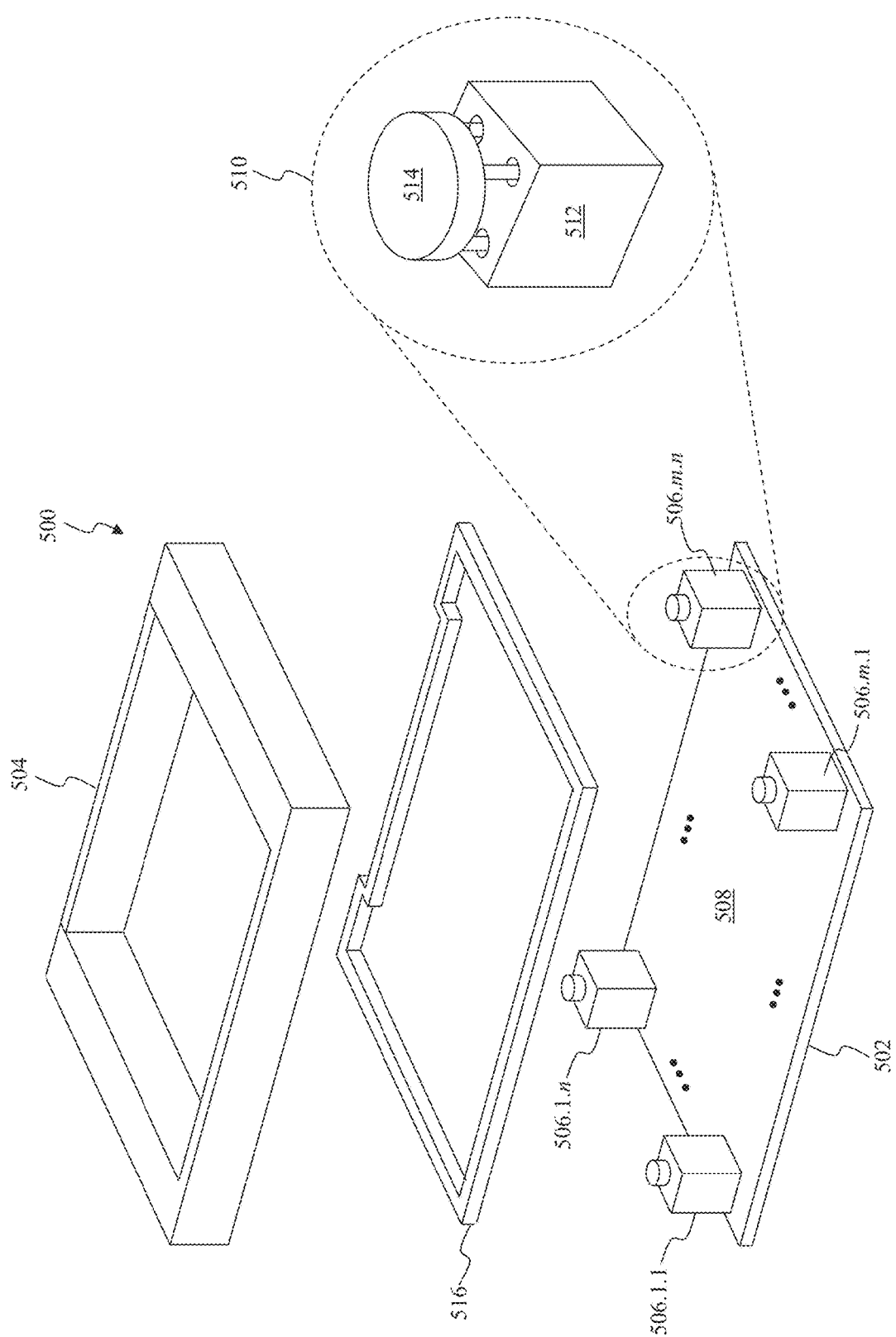
Figure 7:
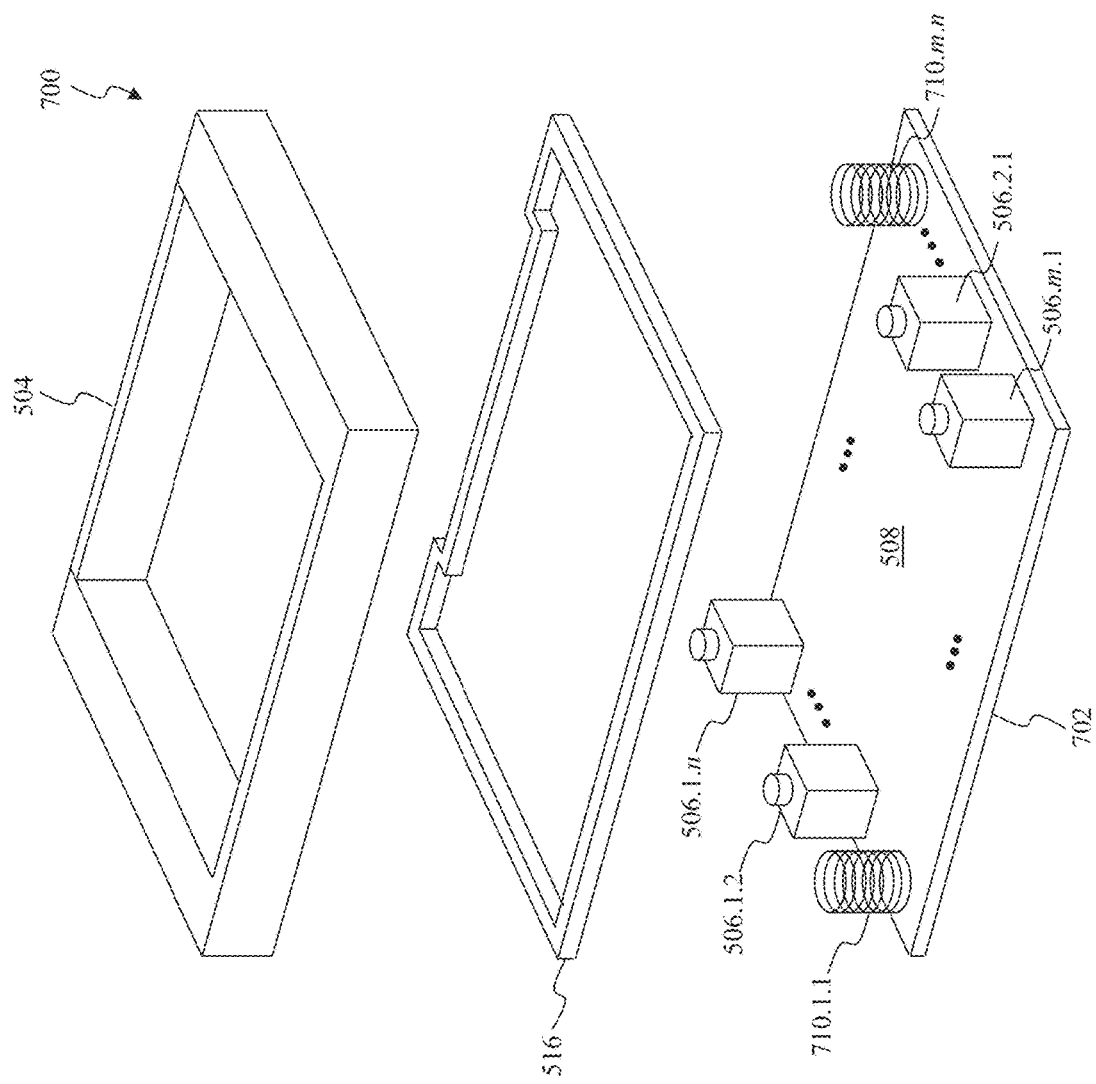
Figure 8:
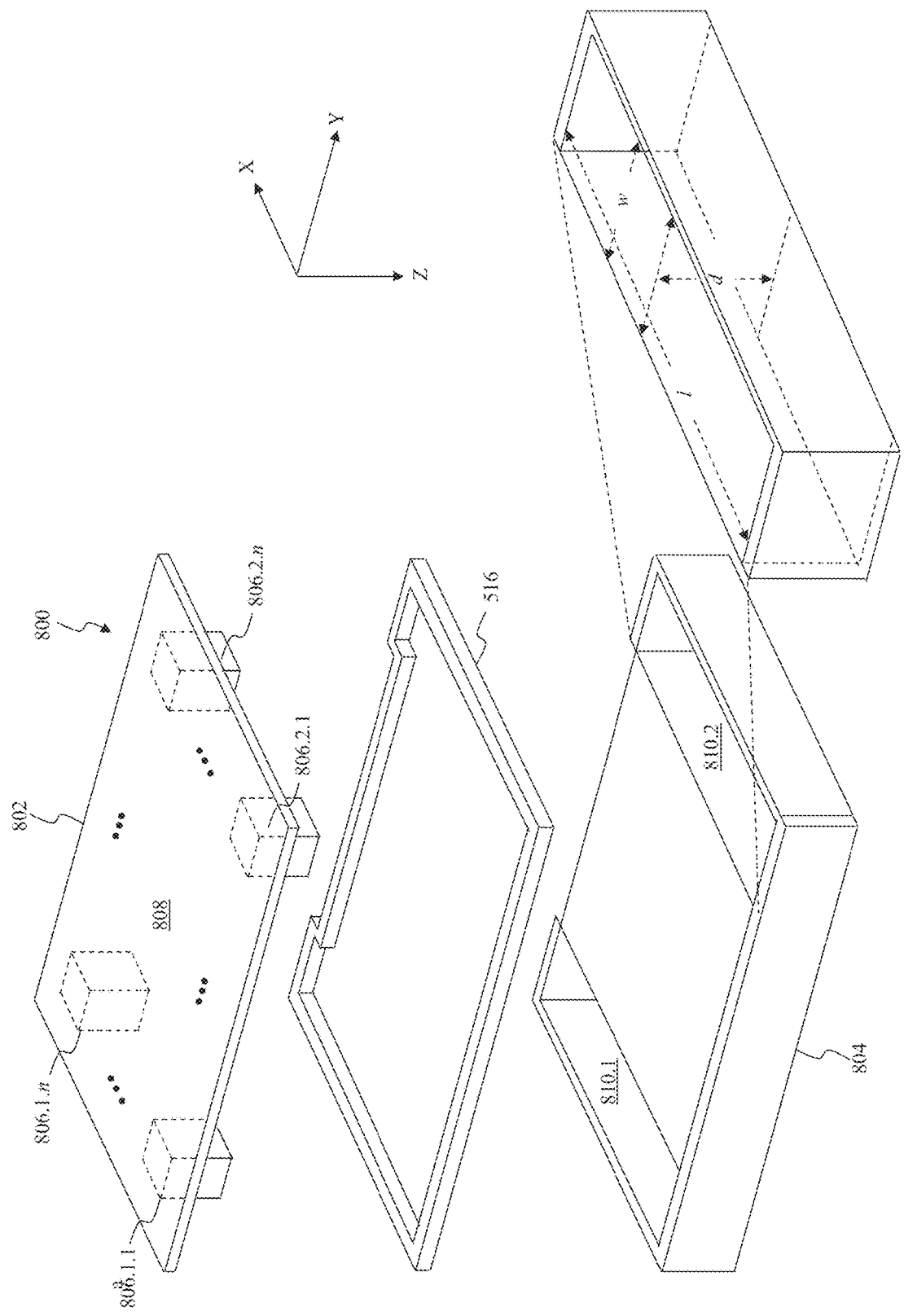
Figure 9A:
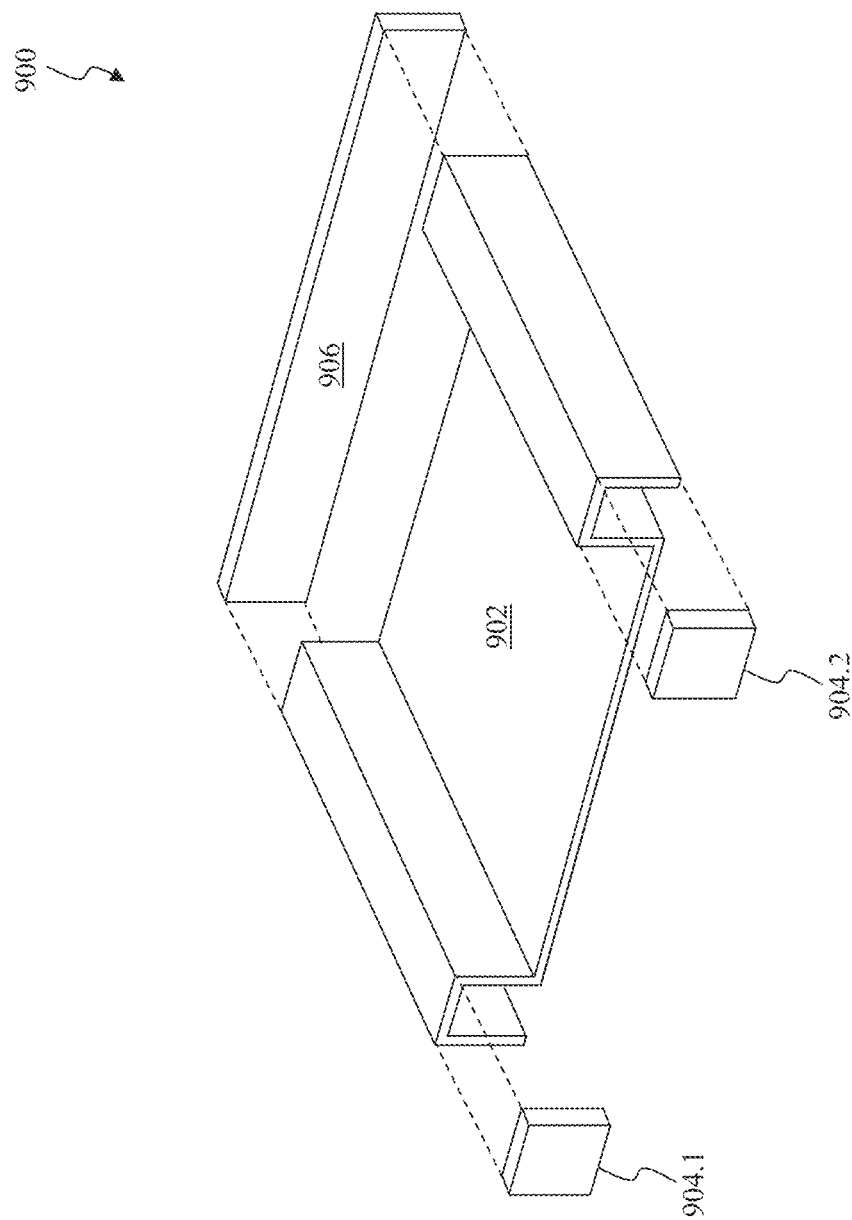
Figure 9B:
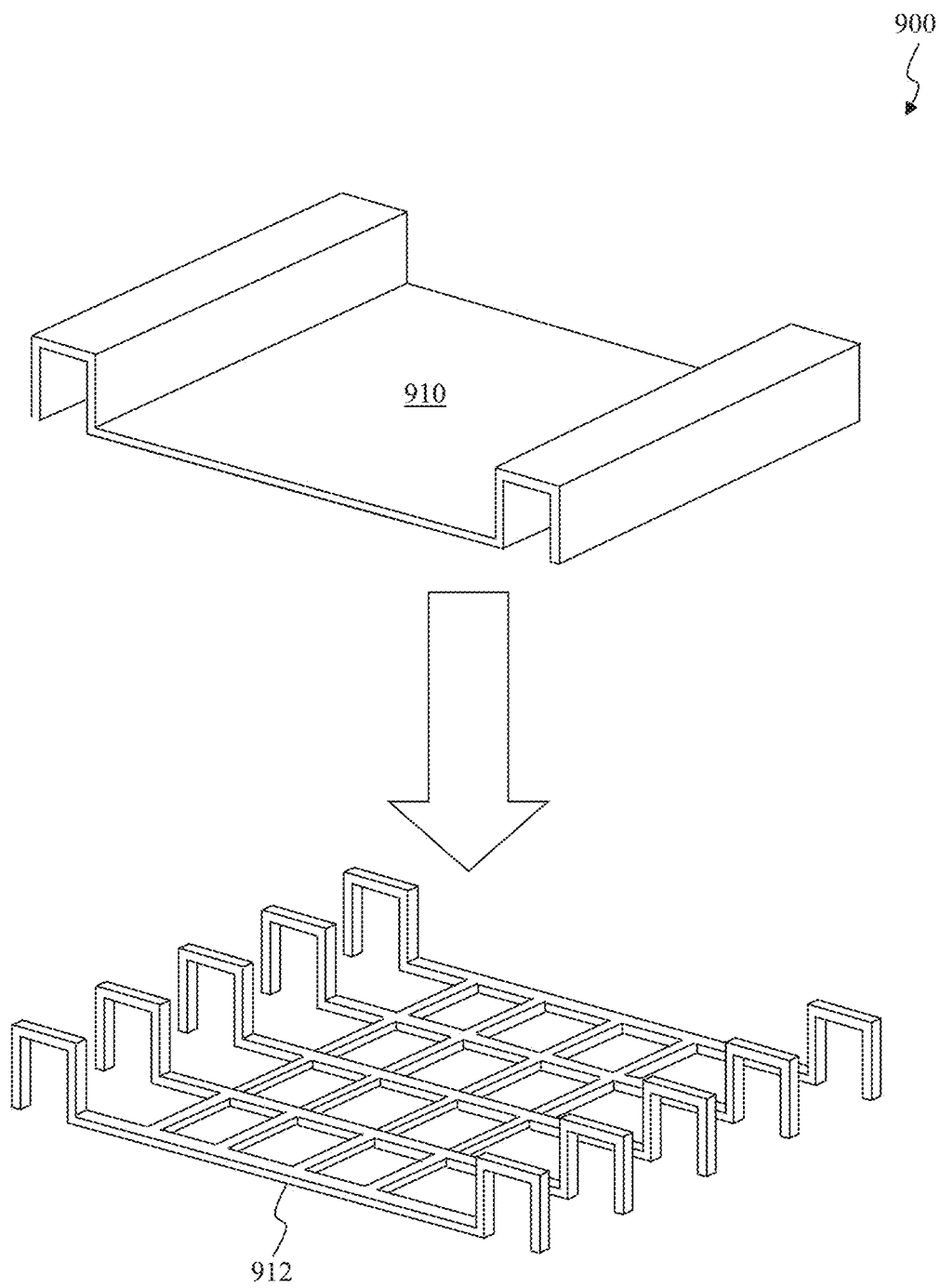
Figure 10:
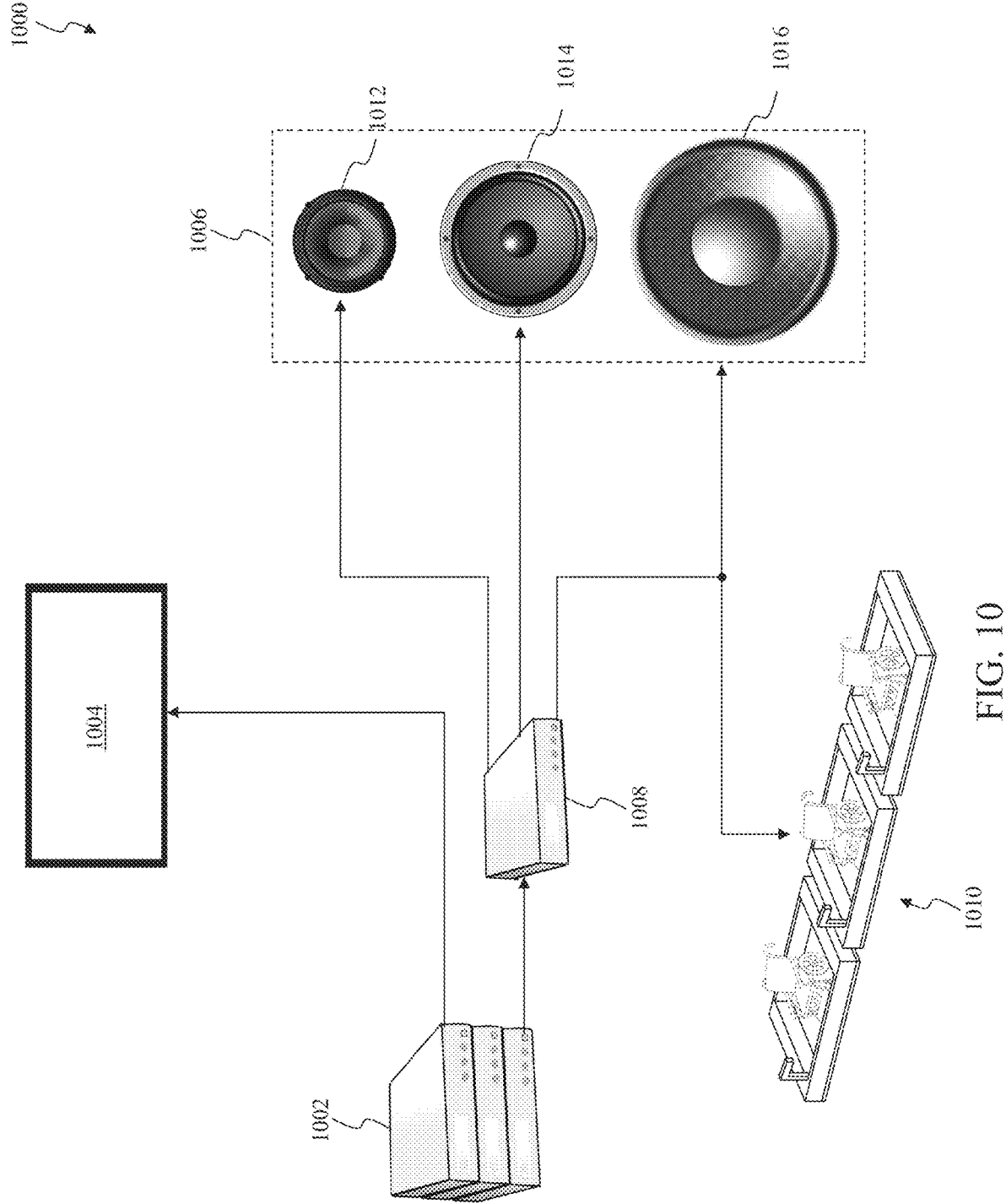
Figure 11:
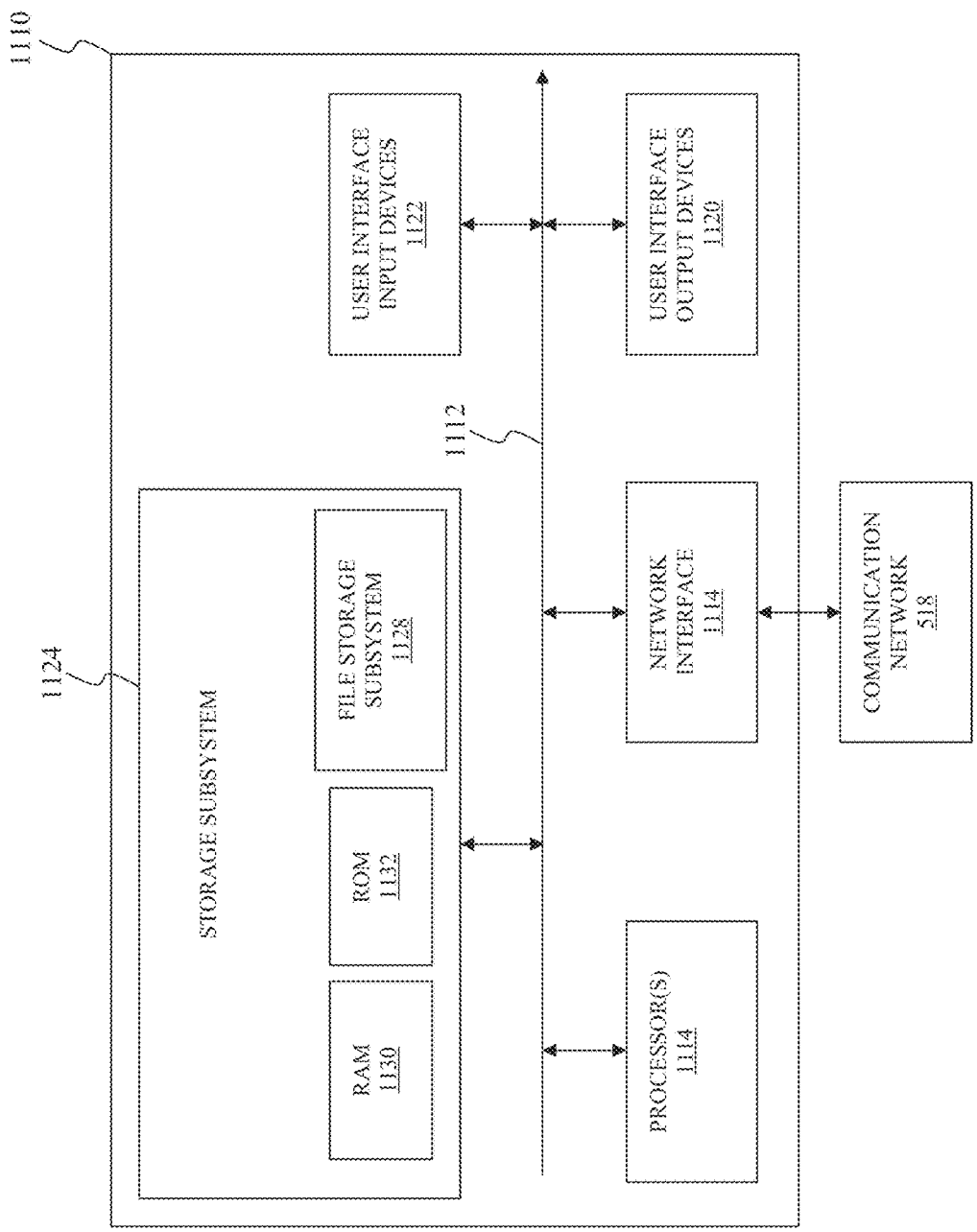

The accompanying drawings, which are incorporated herein and form a part of the specification, illustrate the present disclosure and, together with the description, further serve to explain the principals thereof and to enable a person skilled in the pertinent art to make and use the same. In the drawings:

FIG. 1 illustrates a pictorial representation of an exemplary venue in accordance with some exemplary embodiments of the present disclosure;

FIG. 2A through FIG. 2D graphically illustrates exemplary wheelchair accessible seating locations that can be implemented within the exemplary venue in accordance with some exemplary embodiments of the present disclosure;

FIG. 3A through FIG. 3C graphically illustrates a first exemplary moveable door that can be implemented within the exemplary wheelchair accessible seating locations in accordance with some exemplary embodiments of the present disclosure;

FIG. 4A through FIG. 4C graphically illustrates a second exemplary moveable door that can be implemented within the exemplary wheelchair accessible seating locations in accordance with some exemplary embodiments of the present disclosure;

FIG. 5 graphically illustrates a first exploded view of the exemplary wheelchair accessible seating locations in accordance with some exemplary embodiments of the present disclosure;

FIG. 6A through FIG. 6D graphically illustrates exemplary movements of the exemplary wheelchair accessible seating locations in accordance with some exemplary embodiments of the present disclosure;

FIG. 7 graphically illustrates a second exploded view of the exemplary wheelchair accessible seating locations in accordance with some exemplary embodiments of the present disclosure;

FIG. 8 graphically illustrates a second exploded view of the exemplary wheelchair accessible seating locations in accordance with some exemplary embodiments of the present disclosure;

FIG. 9A and FIG. 9B graphically illustrate simplified exemplary moveable platforms in accordance with some exemplary embodiments of the present disclosure;

FIG. 10 graphically illustrates a simplified block diagram of an exemplary system for operating the exemplary wheelchair accessible seating locations that can be implemented within the exemplary venue in accordance with some exemplary embodiments of the present disclosure; and FIG. 11 graphically illustrates a simplified block diagram of a computer system suitable for use with embodiments described herein according to some exemplary embodiments of the present disclosure.

In the accompanying drawings, like reference numbers indicate identical or functionally similar elements. Additionally, the left most digit(s) of a reference number identifies the drawing in which the reference number first appears.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the examples. This repetition does not in itself dictate a relationship between the embodiments and/or configurations discussed.

Overview

The wheelchair accessible seating locations to be described herein provide new immersive experiences to the people using wheelchairs in viewing an event at a venue while being ADA-compliant. As to be described in further detail below, the wheelchair accessible seating locations can be moved along one or more principal axes, such as the x-axis, the y-axis, and/or the z-axis of the Cartesian coordinate system to provide some examples, as the people using wheelchairs is viewing the event. As to be described in further detail below, the wheelchair accessible seating locations can oscillate along the one or more principal axes to generate vibrations to create the experience of touch to the people using wheelchairs to provide these new immersive experiences to the people using wheelchairs in viewing the event. These movements of the wheelchair accessible seating locations can coincide with, for example, be synchronized to, the event to provide the people using wheelchairs with a substantially similar immersive experience as other spectators of the event that are seated in the seats within the venue.

Exemplary Venue

FIG. 1 illustrates a pictorial representation of an exemplary venue in accordance with some exemplary embodiments of the present disclosure. In the exemplary embodiment illustrated in FIG. 1, a venue 100 represents a location for hosting an event. For example, the venue 100 can represent a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. The event can represent a musical event, a theatrical event, a sporting event, a motion picture, and/or any other suitable event that will be apparent to those skilled in the relevant art(s) without departing the spirit and scope of the present disclosure.

In the exemplary embodiment illustrated in FIG. 1, the venue 100 includes one or more seating sections 102.1 through 102.d to seat an audience to view the event. In some embodiments, the seating sections 102.1 through 102.d represent different seating sections at different heights for viewing the event. As illustrated in FIG. 1, the seating section 102.1 represents a lower seating section for viewing the event and the seating section 102.d represents an upper seating section above the seating section 102.1 for viewing the event. The seating sections 102.1 through 102.d include rows of seats 104.1 through 104.e for seating the audience to view the event. In some embodiments, the rows of seats 104.1 through 104.e represent different rows of seats at different heights for viewing the event. As illustrated in FIG. 1, the row of seats 104.1 represents a lower row of seats for viewing the event and the row of seats 104.e represents an upper row of seats above the row of seats 104.1 for viewing the event. As illustrated in FIG. 1, the rows of seats 104.1 through 104.e include seats 106.1 through 106f for seating the audience to view the event.

As described above, the Americans with Disabilities Act (ADA) requires the venue 100 to be accessible to people with disabilities so they, their families, their companions, and/or friends can enjoy equal access to the event. In the exemplary embodiment illustrated in FIG. 1, the venue 100 includes wheelchair accessible seating locations 108.1 through 108.g to be ADA-compliant. Generally, the wheelchair accessible seating locations 108.1 through 108.g can be located on one or more accessible routes within the venue 100 that provide access from parking and transportation areas and/or that provide access to public areas within the venue 100, such as concessions, restaurants, rest rooms, public telephones, and/or exits to provide some examples. In some embodiments, the wheelchair accessible seating locations 108.1 through 108.g can be arranged within the venue 100 to have lines of sight comparable to those provided to other spectators. In these embodiments, for example, where spectators can be expected to stand during the event, the wheelchair accessible seating locations 108.1 through 108.g can provide lines of sight over standing spectators and over the shoulders of the persons standing in the row immediately in front and over the heads of the persons standing two rows in front. The location of the wheelchair accessible seating locations 108.1 through 108.g as illustrated in FIG. 1 is for exemplary purposes only and not limiting. Those skilled in the relevant art(s) will recognize that one or more of the wheelchair accessible seating locations 108.1 through 108.g can be located elsewhere within the venue 100 without departing from the spirit and scope of the present disclosure.

In the exemplary embodiment illustrated in FIG. 1, the number of wheelchair accessible seating locations from among the wheelchair accessible seating locations 108.1 through 108.g can be at least one (1) percent of the available seating to be ADA-compliant. In some embodiments, for example, when the venue 100 includes more than 300 available seats, the wheelchair accessible seating locations 108.1 through 108.g can be dispersed among different locations within the venue, such as within different seating sections from among the sections 102.1 through 102.d to provide an example. In some embodiments, the wheelchair accessible seating locations 108.1 through 108.g can be dispersed among the different locations to provide a choice of admission prices and views comparable to those for the general public. In some embodiments, one or more companion seats, for example, similar to one of the seats 106.1 through 106f, can be located next to the wheelchair accessible seating locations 108.1 through 108.g to be ADA-compliant. In these embodiments, the one or more companion seats can accommodate one or more friends, family members, and/or companions of the people with disabilities.

Figure 2A:
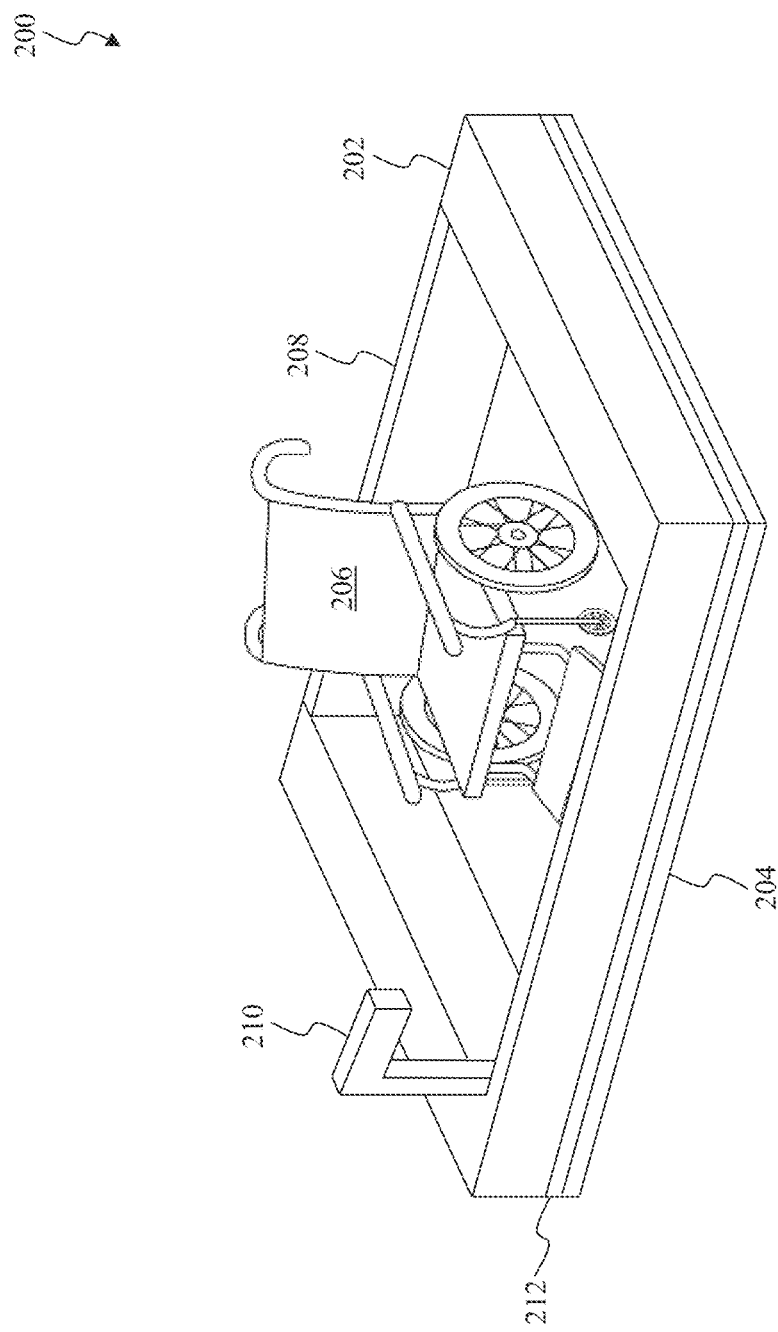

Exemplary Wheelchair Accessible Seating Locations that can be Implemented within the Exemplary Venue FIG. 2A through FIG. 2D graphically illustrates exemplary wheelchair accessible seating locations that can be implemented within the exemplary venue in accordance with some exemplary embodiments of the present disclosure. Generally, haptic technology refers to technologies that can create an experience of touch by applying forces, vibrations, or motions to the audience as the audience is viewing the event. Tactile haptics refer to a type of haptics that relates to the perception of vibration, pressure, and/or temperature to create the experience of touch. Haptic devices can recreate a sense of touch by creating a combination of force, vibration and motion sensations for the audience as the audience is viewing the event. For example, the seats within a venue, such as the seats 106.1 through 106f within the venue 100 to provide an example, can include one or more Haptic devices, such as one or more eccentric rotating mass vibration (ERMV) motors, linear resonant actuators (LRAs), and/or piezo haptics sensors to provide some examples, to generate vibrations to create the experience of touch to the audience to provide new immersive experiences to the audience in viewing the event. However, people with disabilities might not be able to be seated within the seats within the venue. As to be described in further detail below, a wheelchair accessible seating location 200 as illustrated in FIG. 2A can recreate the sense of touch for the people with disabilities to similarly provide these people with new immersive experiences in viewing the event. In the exemplary embodiment illustrated in FIG. 2A, the wheelchair accessible seating location 200 can include a moveable platform 202, a stationary platform 204, and a moveable door 208. The wheelchair accessible seating location 200 can represent exemplary embodiments of one or more of the wheelchair accessible seating locations 108.1 through 108.g as described above in FIG. 1.

In the exemplary embodiment illustrated in FIG. 2A, the moveable platform 202 represents wheelchair accessible seating locations that can accommodate a person using a wheelchair 206. As illustrated in FIG. 2A, the moveable platform 202 represent open, level spaces that accommodate the person using a wheelchair 206 and can have smooth, stable, and slip-resistant surfaces to be ADA-compliant. In some embodiments, the moveable platform 202 can be constructed using one or more metallic elements, for example, copper, aluminum, one or more metallic compounds, one or more metallic mixtures, or alloys, such as steel to provide an example, and/or any other suitable metallic material that will be apparent to those skilled in the relevant art(s) without departing from the spirit and scope of the present disclosure. In some embodiments, the moveable platform 202 can be constructed using one or more synthetic or semi-synthetic organic compounds or materials, such as plastic and/or fiberglass to provide some examples, one or more organic materials, such as carbon fiber to provide an example, and/or any other suitable non-metallic material that will be apparent to those skilled in the relevant art(s) without departing from the spirit and scope of the present disclosure. In some embodiments, the moveable platform 202 can include diamond plating or other similar non-slip flooring products and/or coatings that will be apparent to those skilled in the relevant art(s) without departing from the spirit and scope of the present disclosure to provide some examples to provide the slip-resistant surface to be ADA-compliant.

As to be described in further detail below, the moveable platform 202 can be moved along one or more principal axes, such as the x-axis, the y-axis, and/or the z-axis of the Cartesian coordinate system to provide some examples, as the person in the wheelchair 206 is viewing the event. For example, the moveable platform 202 can be moved along the x-axis of the Cartesian coordinate system to pitch the moveable platform 202. As another example, the moveable platform 202 can be moved along the y-axis of the Cartesian coordinate system to roll the moveable platform 202. In some embodiments, the moveable platform 202 can oscillate along the one or more principal axes to generate vibrations to create the experience of touch to the person using the wheelchair 206. In these embodiments, these movements of the moveable platform 202 can coincide with, for example, be synchronized to, the event to provide the person using the wheelchair 206 with a substantially similar immersive experience as other spectators of the event that are seated in the seats within the venue.

Although not illustrated in FIG. 2A, the moveable platform 202, in some embodiments, can include one or more mechanical wheelchair restraints to mechanically secure the wheelchair 206 to these moveable platforms. In these embodiments, the one or more mechanical wheelchair restraints can prevent the wheelchair 206 from moving, for example, rolling, as the moveable platform 202 is being moved along the one or more principal axes as described above. In some embodiments, the one or more mechanical wheelchair restraints can include mechanical wheelchair tie-downs, mechanical wheelchair tie-down straps, and/or wheelchair docking systems to provide some examples.

In the exemplary embodiment illustrated in FIG. 2A, the stationary platform 204 can include one or more electrical, mechanical, and/or electro-mechanical devices that can move the moveable platform 202, respectively, along the one or more principal axes, such as the x-axis, the y-axis, and/or the z-axis of the Cartesian coordinate system to provide some examples, in a substantially similar manner as described above. In some embodiments, the one or more electrical, mechanical, and/or electro-mechanical devices can include one or more haptic devices, such as one or more eccentric rotating mass vibration (ERMV) motors, linear resonant actuators (LRAs), and/or piezo haptics sensors to move the moveable platform 202 along the one or more principal axes. In some embodiments, the one or more haptic devices can oscillate the moveable platform 202 along the one or more principal axes to generate vibrations to create the experience of touch to the person using the wheelchair 206. In these embodiments, the movement of the one or more haptic devices can coincide with, for example, be synchronized to, the event to provide the person using the wheelchair 206 with a substantially similar immersive experience as other spectators of the event that are seated in the seats within the venue.

As illustrated in FIG. 2A, the wheelchair accessible seating location 200 can include a flexible gasket 212 that is situated between the moveable platform 202 and the stationary platform 204. In some embodiments, the flexible gasket 212 can be characterized as moving, for example, expanding and/or contracting, in response to the movement of the moveable platform 202 as described above. In these embodiments, this flexible gasket 212 effectively provides a flexible cushion between the between the moveable platform 202 and the stationary platform 204 to prevent the moveable platform 202 from contacting, for example, banging against, the stationary platform 204 as the moveable platform 202 is being moved as described above.

Figure 2B:
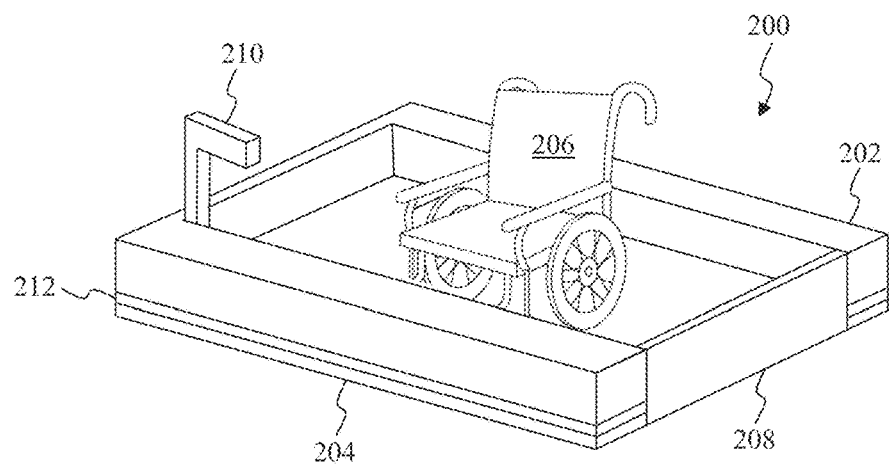
Figure 2C:
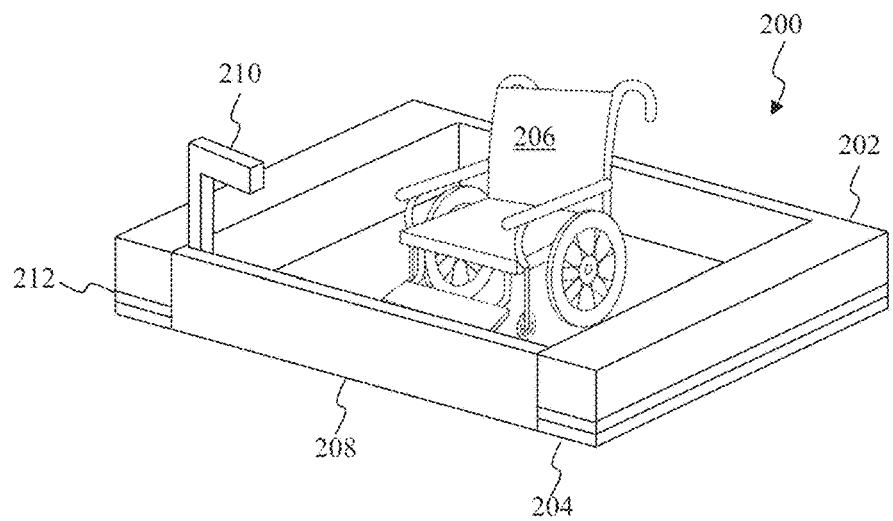
Figure 2D:
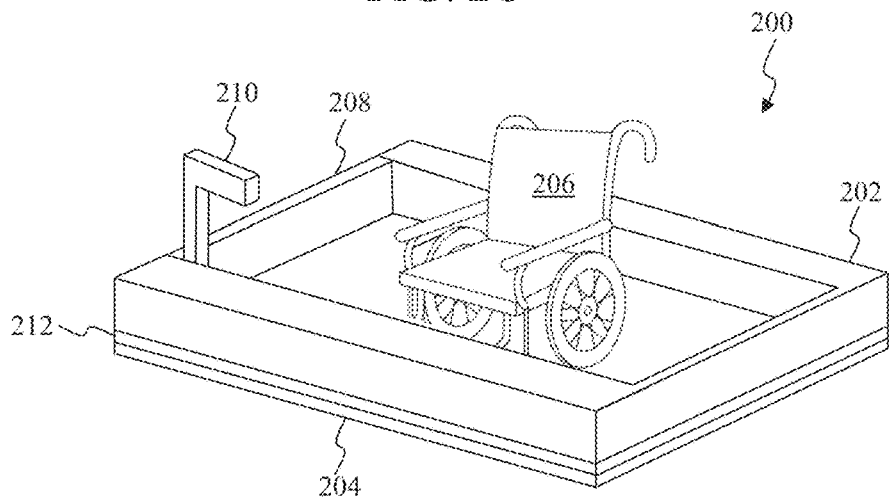

In the exemplary embodiment illustrated in FIG. 2A, the moveable door 208 represents a moveable barrier that allow the person using the wheelchair 206 ingress into and/or egress from the wheelchair accessible seating location 200. In some embodiments, the location of the moveable door 208 within can be characterized as being oriented to the back side of the wheelchair 206. However, it is possible that the location of the moveable door 208 within can be characterized as being oriented to the left side of the wheelchair 206 as illustrated in FIG. 2B, the front side of the wheelchair 206 as illustrated in FIG. 2C, and/or the right side of the wheelchair 206 as illustrated in FIG. 2D. In some embodiments, the moveable door 208 can be implemented to be a hinged moveable barrier and/or a sliding moveable barrier to provide some examples.

As illustrated in FIG. 2A, the moveable platform 202 can include a control interface 210 to control the operation of the moveable platform 202. In the exemplary embodiment illustrated in FIG. 2A, the control interface 210 represents a control mechanism having one or more electrical, mechanical, and/or electro-mechanical controls to configure the moveable platform 202. In some embodiments, the control interface 210 can be mechanically connected to the moveable platform 202 using one or more mechanical fasteners, such as nuts, screws, bolts, rivets, pins, and/or lags to provide some examples. In some embodiments, a first portion of the control interface 210 having these controls can be removably from, or be detached, from a second portion of the control interface 210 that is mechanically connected to the moveable platform 202 using the one or more mechanical fasteners as described above. In these embodiments, the first portion of the control interface 210 can be coupled wirelessly and/or by wireline to the second portion of the control interface 210. Alternatively, or in addition to, the functionality of the control interface 210, as to be described in further detail below, can be implemented within a software application (app) that is executed by a portable electronic device, such as a smartphone, a tablet computer, and/or a smartwatch to provide some examples. In some embodiments, the person in the wheelchair 206 can configure the moveable platform 202 by interacting with the software application using the portable electronic device.

In some embodiments, the one or more one or more electrical, mechanical, and/or electro-mechanical controls can include one or more on-off controls to activate, or turn-on, and/or to deactivate, or turn-off, the wheelchair accessible seating location 200. In some embodiments, the one or more one or more electrical, mechanical, and/or electro-mechanical controls can include one or more attenuation controls to configure the vibrations generated by the wheelchair accessible seating location 200. In some embodiments, the one or more attenuation controls can be used to set boundaries, for example, in terms of magnitude, for the vibrations generated by the wheelchair accessible seating location 200. In some embodiments, the control interface 210 can include one or more video systems having one or more visual displays, such as one or more flat-panel devices, such as one or more liquid crystal displays (LCDs), one or more light-emitting diode (LED) displays, one or more organic light-emitting diode (OLED) displays, and/or one or more quantum dots (QDs) displays to provide some examples, and/or one or more projection devices, and/or any other suitable electrical, mechanical, and/or electro-mechanical device for presenting one or more visible images that will be apparent to those skilled in the relevant art(s) without departing the spirit and scope of the present disclosure. In these embodiments, the one or more video systems can display the event in real-time, or near real-time, instructions relating to the operation of the wheelchair accessible seating location 200 and/or information related to the event, for example, close captioning. In these embodiments, the one or more video systems can display advertisements and/or other information related to the venue, for example, a map of the venue highlighting concessions, restaurants, rest rooms, public telephones, and/or exits. In some embodiments, the control interface 210 can include one or more sound systems having one or more auditory speakers, to deliver sound of the event in real-time, or near real-time, instructions relating to the operation of the wheelchair accessible seating location 200, and/or information related to the event and/or the venue.

Exemplary Moveable Doors that can be Implemented within the Exemplary Wheelchair Accessible Seating Locations FIG. 3A through FIG. 3C graphically illustrates a first exemplary moveable door that can be implemented within the exemplary wheelchair accessible seating locations in accordance with some exemplary embodiments of the present disclosure. In the exemplary embodiment illustrated in FIG. 3A through FIG. 3C, a wheelchair accessible seating location 300 can include a moveable platform 302, a stationary platform 304, and a moveable door 306. In the exemplary embodiment illustrated in FIG. 3A through FIG. 3C, the stationary platform 304 can move the moveable platform 302 respectively, along the one or more principal axes, such as the x-axis, the y-axis, and/or the z-axis of the Cartesian coordinate system to provide some examples, in a substantially similar manner as described above. And as illustrated in FIG. 3A through FIG. 3C, the moveable door 306 represents a moveable barrier that allows a person using a wheelchair, such as the wheelchair 206 as described above in FIG. 1, to ingress into and/or egress from the wheelchair accessible seating location 300. The wheelchair accessible seating location 300 can represent an exemplary embodiment of the wheelchair accessible seating location 200 as described above in FIG. 2A.

As illustrated in FIG. 3A, the moveable door 306 can be characterized as being in a first position, such as an open position to provide an example, to allow the person using the wheelchair to ingress into and/or egress from the wheelchair accessible seating location 300. In some embodiments, the moveable door 306 can be characterized as being open when in the first position. In the exemplary embodiment illustrated in FIG. 3A, the moveable door 306, when in the first position, can be characterized as creating an incline plane, such as a wheelchair ramp to provide an example, to allow the wheelchair to ingress into and/or egress from the wheelchair accessible seating location 300. As illustrated in FIG. 3B, the moveable door 306 can be moved from the first position to a second position, such as a closed position to provide an example. In some embodiments, the moveable door 306 can be mechanically connected to the moveable platform 302 using one or more mechanical hinges and/or pins that allow the moveable door 306 to open and/or close by rotating about the stationary platform 304. As illustrated in FIG. 3C, the moveable door 306 can be characterized as being in the second position to secure the person using the wheelchair within the wheelchair accessible seating location 300. In some embodiments, the moveable door 306 can be characterized as being closed when in the second position. In some embodiments, the moveable platform 302 can include one or more electrical, mechanical, and/or electro-mechanical locking mechanisms to secure the moveable door 306 in the second position.

FIG. 4A through FIG. 4C graphically illustrates a second exemplary moveable door that can be implemented within the exemplary wheelchair accessible seating locations in accordance with some exemplary embodiments of the present disclosure. In the exemplary embodiment illustrated in FIG. 4A through FIG. 4C, a wheelchair accessible seating location 400 can include a moveable platform 402, a stationary platform 404, and moveable doors 406.1 and 406.2. In the exemplary embodiment illustrated in FIG. 4A through FIG. 4C, the stationary platform 404 can move the moveable platform 402 respectively, along the one or more principal axes, such as the x-axis, the y-axis, and/or the z-axis of the Cartesian coordinate system to provide some examples, in a substantially similar manner as described above. And as illustrated in FIG. 4A through FIG. 4C, the moveable doors 406.1 and 406.2 represent moveable barriers that allows a person using a wheelchair, such as the wheelchair 206 as described above in FIG. 1, to ingress into and/or egress from the wheelchair accessible seating location 400. The wheelchair accessible seating location 400 can represent an exemplary embodiment the wheelchair accessible seating location 200 as described above in FIG. 2A.

As illustrated in FIG. 4A, the moveable doors 406.1 and 406.2 can be characterized as being in a first position, such as an open position to provide an example, to allow the person using the wheelchair to ingress into and/or egress from the wheelchair accessible seating location 400. In some embodiments, the moveable doors 406.1 and 406.2 can be characterized as being open when in the first position. As illustrated in FIG. 4B, the moveable doors 406.1 and 406.2 can be moved from the first position to a second position, such as a closed position to provide an example. In some embodiments, the moveable doors 406.1 and 406.2 can be mechanically connected to the stationary platform 404 using one or more mechanical hinges and/or pins that allow the moveable door 406 to open and/or close by rotating about the moveable platform 402. As illustrated in FIG. 4C, the moveable doors 406.1 and 406.2 can be characterized as being in the second position to secure the person using the wheelchair 206 within the wheelchair accessible seating location 400. In some embodiments, the moveable doors 406.1 and 406.2 can be characterized as being closed when in the second position. In some embodiments, the moveable platform 402 can include one or more electrical, mechanical, and/or electro-mechanical locking mechanisms to secure the moveable doors 406.1 and 406.2 in the second position.

Exemplary Stationary Platforms that can be Implemented within the Exemplary Wheelchair Accessible Seating Locations FIG. 5 graphically illustrates a first exploded view of the exemplary wheelchair accessible seating locations in accordance with some exemplary embodiments of the present disclosure. Specifically, FIG. 5 illustrates a top-down exploded view of a wheelchair accessible seating location 500 having a stationary platform 502 and a moveable platform 504. Although not illustrated in FIG. 5, the wheelchair accessible seating location 500 can include a moveable door, such as the moveable door 208 as described above in FIG. 2A. The wheelchair accessible seating location 500 can represent an exemplary embodiment the wheelchair accessible seating location 200 as described above in FIG. 2A.

In the exemplary embodiment illustrated in FIG. 5, the stationary platform 502 includes haptic devices 506.1.1 through 506.$m.n$ to move the moveable platform 504 along one or more principal axes, such as the x-axis, the y-axis, and/or the z-axis of the Cartesian coordinate system to provide some examples. In some embodiments, the haptic devices 506.1.1 through 506.$m.n$ can oscillate the moveable platform 504 along the one or more principal axes to generate vibrations in a substantially similar manner as described above. In some embodiments, the haptic devices 506.1.1 through 506.$m.n$ can be mechanically connected to the moveable platform 504 using one or more articulating mechanical joints, such as pin joints, prismatic joints, ball joints, knuckle joints, turnbuckles, cotter joints, bolted joints, screw joints, and/or universal joints to provide some examples. As illustrated in FIG. 5, the haptic devices 506.1.1 through 506.$m.n$ can be mechanically connected to a stationary mechanical base 508 using the one or more mechanical fasteners as described above. In some embodiments, the stationary mechanical base 508 can be characterized as being parallel to a plane along the one or more principal axes, for example, an x-y plane of the Cartesian coordinate system. In these embodiments, the stationary mechanical base 508 can be mechanically connected to a floor of a venue, such as the venue 100 as described above in FIG. 1 to provide an example, using the one or more mechanical fasteners as described above to form an immoveable surface. Alternatively, or additionally, the haptic devices 506.1.1 through 506.$m.n$ can be mechanically connected to the floor of the venue using the one or more mechanical fasteners as described above. In some embodiments, the stationary platform 502 need not include the stationary mechanical base 508 when the one or more electrical, mechanical, and/or electro-mechanical devices are mechanically connected to the floor of the venue. In some embodiments, the stationary mechanical base 508 can be constructed using the one or more metallic elements, the one or more metallic compounds, the one or more metallic mixtures, and/or the any other suitable metallic material as described above. In some embodiments, the stationary mechanical base 508 can be constructed using the one or more synthetic or semi-synthetic organic compounds or materials, the one or more organic materials, and/or the other suitable non-metallic material as described above.

Generally, the haptic devices 506.1.1 through 506.$m.n$ can be arranged into an array of haptic devices having m-columns and n-rows. As illustrated in FIG. 5, at least two of the having m-columns of the haptic devices 506.1.1 through 506.$m.n$ and/or at least two of the having n-rows of the haptic devices 506.1.1 through 506.$m.n$ can be arranged along a periphery, or border, of the stationary mechanical base 508. In some embodiments, the haptic devices 506.1.1 through 506.$m.n$ within neighboring, adjacent, columns from among the m-columns and/or within neighboring, adjacent, rows from among the n-rows can be equally spaced apart from one another. In some embodiments, the m-columns of haptic devices 506.1.1 through 506.$m.n$ can include the same number of rows of haptic devices as one another. In some embodiments, at least two columns from among the m-columns of haptic devices 506.1.1 through 506.$m.n$ can include different numbers of rows of haptic devices from one another. In some embodiments, one or more of the haptic devices 506.1.1 through 506.$m.n$ can be implemented using a tactile transducer, also referred to as a bass shaker, 510. The tactile transducer 510 represents a type of linear resonant actuator (LRA) that oscillates about one of the one or more principal axes, for example, along the z-axis of the Cartesian coordinate system, to generate vibrations. As illustrated in FIG. 5, the tactile transducer 510 includes a mechanical housing 512 and a moveable plate 514. Generally, the tactile transducer 510 includes one or more pistons which are driven by one or more voice coils within the mechanical housing 512. The one or more voice coils can exert force on the one or more pistons that are coupled to the moveable plate 514 to cause the moveable plate 514 to oscillate along one of the one or more principal axes to generate the vibrations.

As illustrated in FIG. 5, the wheelchair accessible seating location 500 can include a flexible gasket 516 between the stationary platform 502 and the moveable platform 504. In some embodiments, the flexible gasket 516 can be characterized as moving, for example, flexing, in response to the movement of the moveable platform 504 as described above. In these embodiments, this flexible gasket 516 effectively provides a flexible cushion between the between the stationary platform 502 and the moveable platform 504 to prevent the moveable platform 504 from contacting, for example, banging against, the stationary platform 502 as the moveable platform 504 is being moved as described above. The flexible gasket 516 can be implemented using any suitable natural rubber material and/or synthetic rubber material that will be apparent to those skilled in the relevant art(s) without departing from the spirit and scope of the present disclosure. In some embodiments, the flexible gasket 516 represents a hollow structure, for example, an O-ring structure or O-ring-like structure, of the natural rubber material and/or synthetic rubber material that is situated around a periphery of the moveable platform 504 as illustrated in FIG. 5.

Exemplary Movement of the Exemplary Wheelchair Accessible Seating Locations

FIG. 6A through FIG. 6D graphically illustrates exemplary movements of the exemplary wheelchair accessible seating locations in accordance with some exemplary embodiments of the present disclosure. In the exemplary embodiment illustrated in FIG. 6A through FIG. 6D, a wheelchair accessible seating location 600 includes a stationary platform 602 and a moveable platform 604. Although not illustrated in FIG. 6, the wheelchair accessible seating location 600 can include a moveable door, such as the moveable door 208 as described above in FIG. 2A. Although not illustrated in FIG. 6, the wheelchair accessible seating location 600 can include a flexible gasket, such as the flexible gasket 212 as described above in FIG. 2A and/or the flexible gasket 516 as described above in FIG. 5 to provide some examples. The wheelchair accessible seating location 600 can represent an exemplary embodiment of the wheelchair accessible seating location 200 as described above in FIG. 2A. As to be described in further detail below, wheelchair accessible seating location 600 can oscillate along one or more principal axes, such as the x-axis, the y-axis, and/or the z-axis of the Cartesian coordinate system to provide some examples, to generate vibrations to create the experience of touch to a person using a wheelchair, such as the wheelchair 206 as described above in FIG. 2A, as the person in the wheelchair is viewing an event within a venue, such as the venue 100 as described above in FIG. 1.

In the exemplary embodiment illustrated in FIG. 6A through FIG. 6D, the stationary platform 602 includes tactile transducers 606.1.1 through 606.2.2 to move the moveable platform 604 along one of the one or more principal axes, such as the z-axis of the Cartesian coordinate system to provide an example. In the exemplary embodiment illustrated in FIG. 6A through FIG. 6D, the tactile transducers 606.1.1 through 606.2.2 can move corresponding moveable plates 608 about one of the one or more principal axes, for example, along the z-axis of the Cartesian coordinate system along the z-axis of the Cartesian coordinate system to provide an example, to move the moveable platform 604. As illustrated in FIG. 6A through FIG. 6D, the tactile transducers 606.1.1 through 606.2.2 can be arranged into an array of haptic devices having two (2) columns and two (2) rows. In some embodiments, the tactile transducers 606.1.1 through 606.2.2 can be arranged around a periphery, or border, of the stationary platform 602. In these embodiments, the tactile transducers 606.1.1 through 606.2.2 can be arranged to be proximate to the four corners of the stationary platform 602.

Figure 6A:
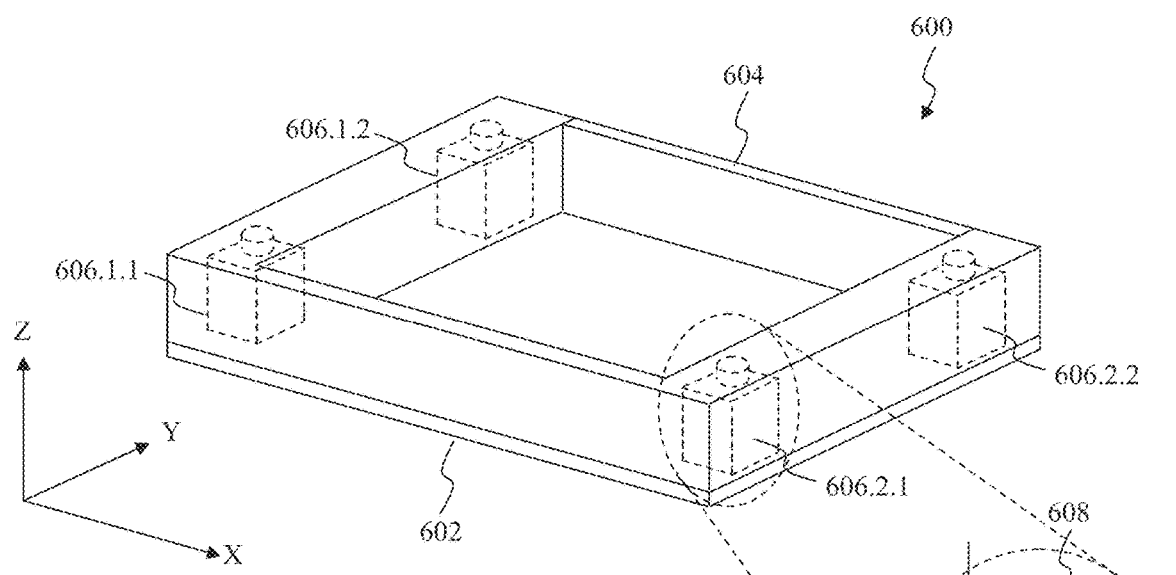

In the exemplary embodiment illustrated in FIG. 6A, the tactile transducers 606.1.1 through 606.2.2 can be characterized as extending a first distance D1. As illustrated in FIG. 6A, the moveable plates 608 of the tactile transducers 606.1.1 through 606.2.2 can extend the first distance D1 from their corresponding mechanical housings 610. In some embodiments, the moveable platform 604 can be characterized as being parallel to a plane along the one or more principal axes, for example, an x-y plane of the Cartesian coordinate system.

Figure 6B:
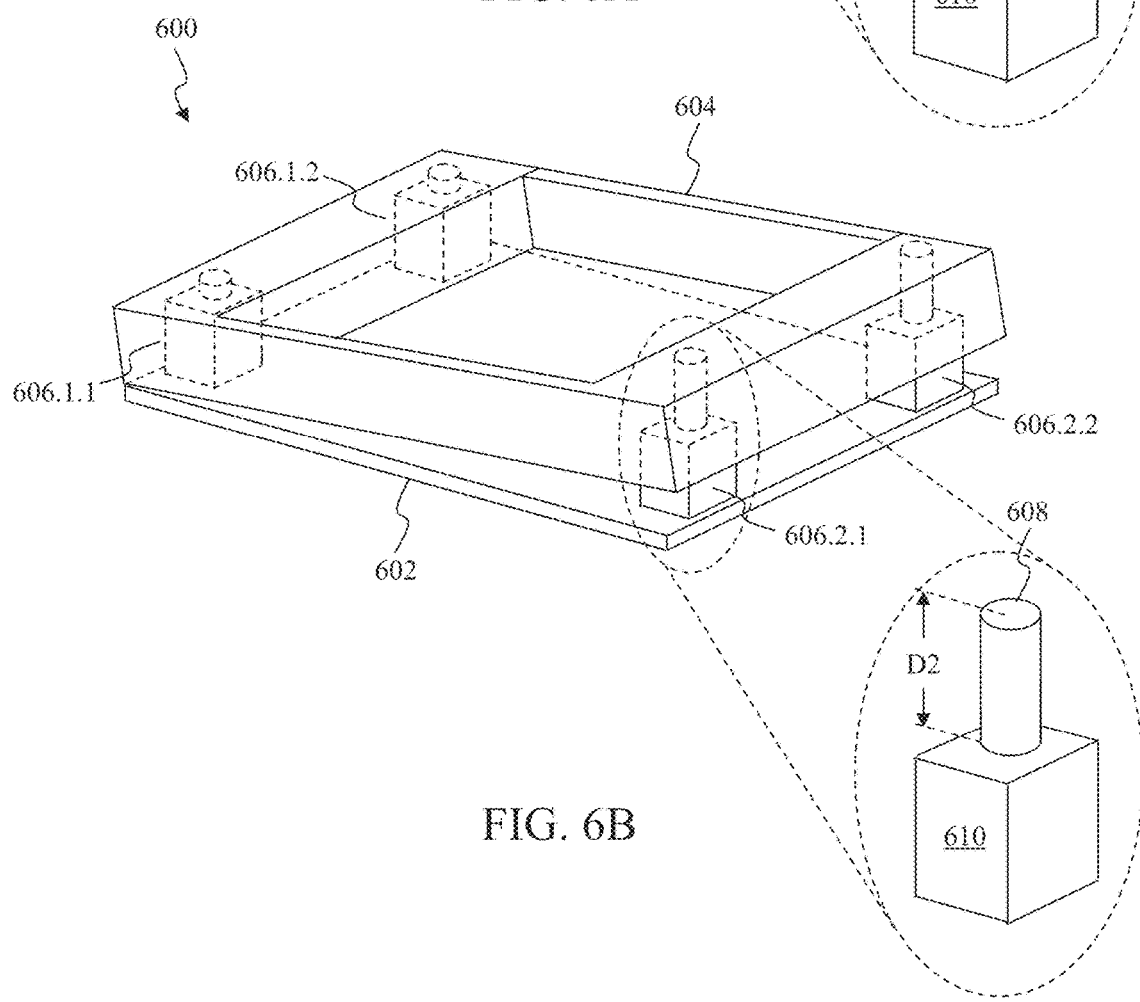

In the exemplary embodiment illustrated in FIG. 6B, the tactile transducers 606.1.1 and 606.1.2 can be characterized as extending the first distance D1 and the tactile transducers 606.2.1 and 606.2.2 can be characterized as extending a second distance D2 that is greater than the first distance D1. As illustrated in FIG. 6B, the moveable plates 608 of the tactile transducers 606.1.1 and 606.1.2 can extend the first distance D1 from their corresponding mechanical housings 610 and the moveable plates 608 of the tactile transducers 606.2.1 through 606.2.2 can extend the second distance D2 from their corresponding mechanical housings 610. In some embodiments, a first side of the moveable platform 604 adjacent to, or neighboring, the tactile transducers 606.1.1 and 606.1.2 can be characterized as being at a lower along one of the one or more principal axes, for example, along the z-axis of the Cartesian coordinate system, than a second side of the moveable platform 604 adjacent to, or neighboring, the tactile transducers 606.2.1 through 606.2.2. This configuration and arrangement of the tactile transducers 606.1.1 through 606.2.2 effectively rotates, or rolls, the moveable platform 604 about one of the one or more principal axes, for example, along the y-axis of the Cartesian coordinate system when compared to the configuration and arrangement of the tactile transducers 606.2.1 through 606.2.2 as illustrated in FIG. 6A.

Figure 6C:
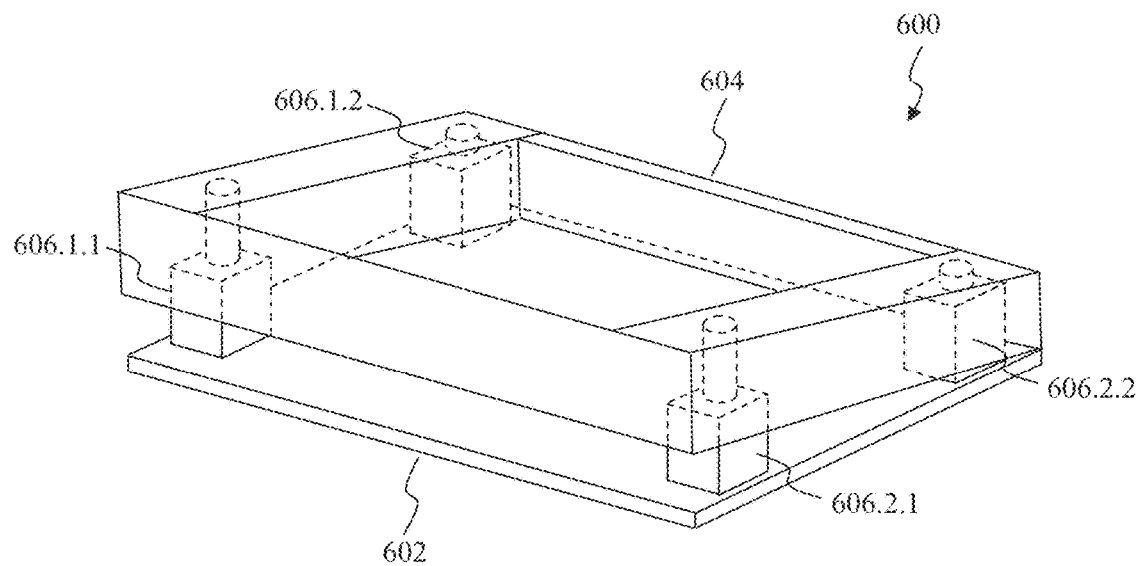

In the exemplary embodiment illustrated in FIG. 6C, the tactile transducers 606.1.2 and 606.2.2 can be characterized as extending the first distance D1 and the tactile transducers 606.1.1 and 606.2.1 can be characterized as extending the second distance D2. As illustrated in FIG. 6C, the moveable plates 608 of the tactile transducers 606.1.2 and 606.2.2 can extend the first distance D1 from their corresponding mechanical housings 610 and the moveable plates 608 of the tactile transducers 606.1.1 and 606.2.1 can extend the second distance D2 from their corresponding mechanical housings 610. In some embodiments, a first side of the moveable platform 604 adjacent to, or neighboring, the tactile transducers 606.1.2 and 606.2.2 can be characterized as being at a lower along one of the one or more principal axes, for example, along the z-axis of the Cartesian coordinate system, than a second side of the moveable platform 604 adjacent to, or neighboring, the tactile transducers 606.1.1 through 606.2.1. This configuration and arrangement of the tactile transducers 606.1.1 through 606.2.2 effectively rotates, or tilts, the moveable platform 604 about one of the one or more principal axes, for example, along the x-axis of the Cartesian coordinate system when compared to the configuration and arrangement of the tactile transducers 606.2.1 through 606.2.2 as illustrated in FIG. 6A.

Figure 6D:
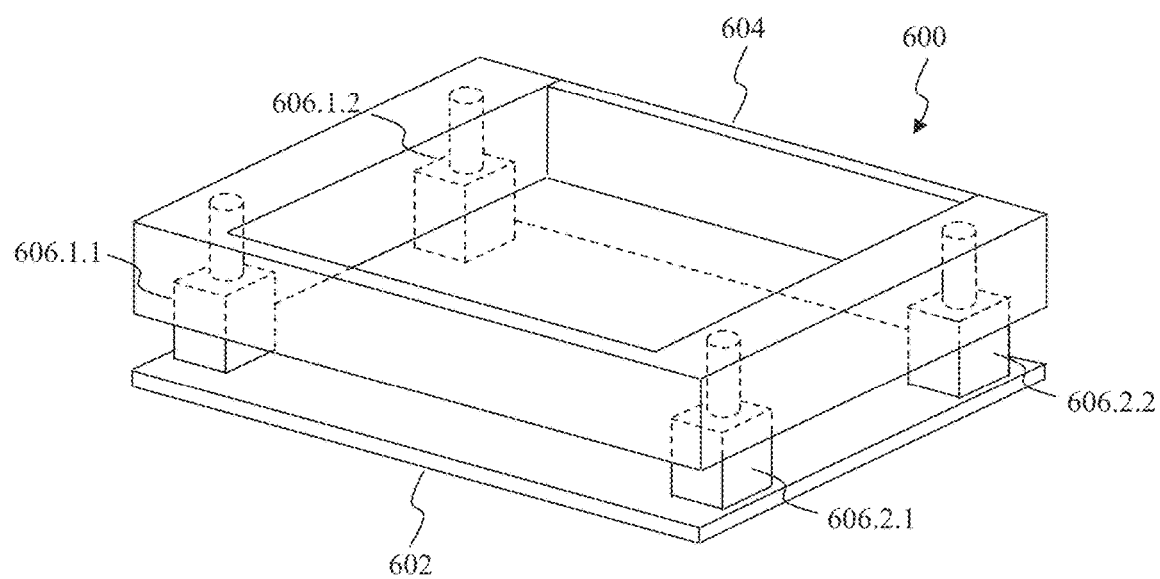

In the exemplary embodiment illustrated in FIG. 6D, the tactile transducers 606.1.1 through 606.2.2 can be characterized as extending the first distance D2. As illustrated in FIG. 6A, the moveable plates 608 of the tactile transducers 606.1.1 through 606.2.2 can extend the first distance D2 from their corresponding mechanical housings 610. In some embodiments, the moveable platform 604 can be characterized as being parallel to a plane along the one or more principal axes, for example, an x-y plane of the Cartesian coordinate system. In these embodiments, the moveable platform 604 can be characterized as not contacting, for example, raised from, the stationary platform 602.

As described above, the wheelchair accessible seating location 600 can oscillate along the one or more principal axes, such as the x-axis, the y-axis, and/or the z-axis of the Cartesian coordinate system to provide some examples, to generate the vibrations. In some embodiments, the tactile transducers 606.1.1 through 606.2.2 can oscillate between the configuration and arrangement of the tactile transducers 606.1.1 through 606.2.2 illustrated in FIG. 6A and the configuration and arrangement of the tactile transducers 606.1.1 through 606.2.2 as illustrated in FIG. 6D to cause the moveable platform 604 to oscillate about one of the one or more principal axes, for example, along the z-axis of the Cartesian coordinate system, to generate vibrations. Those skilled in the relevant art(s) will recognize that the tactile transducers 606.1.1 through 606.2.2 can oscillate between any of the configurations and arrangements of the tactile transducers 606.1.1 through 606.2.2 as illustrated in FIG. 6A through FIG. 6D to oscillate along the one or more principal axes without departing from the spirit and scope of the present disclosure.

FIG. 7 graphically illustrates a second exploded view of the exemplary wheelchair accessible seating locations in accordance with some exemplary embodiments of the present disclosure. Specifically, FIG. 7 illustrates an exploded view of a wheelchair accessible seating location 700 having the moveable platform 504 as described above in FIG. 5 and a stationary platform 702. Although not illustrated in FIG. 7, the wheelchair accessible seating location 700 can include a moveable door, such as the moveable door 208 as described above in FIG. 2A. The wheelchair accessible seating location 700 can represent an exemplary embodiment of the wheelchair accessible seating location 200 as described above in FIG. 2A. The wheelchair accessible seating location 700 shares many substantially similar features as the wheelchair accessible seating location 500 as described above in FIG. 5. Therefore, only differences between the wheelchair accessible seating location 500 and the wheelchair accessible seating location 700 are to be described in further detail below.

In the exemplary embodiment illustrated in FIG. 7, the stationary platform 702 includes the haptic devices 506.1.1 through 506.m.n to move the moveable platform 704 along one or more principal axes, such as the x-axis, the y-axis, and/or the z-axis of the Cartesian coordinate system to provide some examples, in a substantially similar manner as described above. As illustrated in FIG. 7, the stationary platform 702 can include mechanical springs 710.1.1 through 710.m.n. In some embodiments, the mechanical springs 710.1.1 through 710.m.n can be characterized as being a substitute for one or more of the haptic devices 506.1.1 through 506.m to provide a more economical wheelchair accessible seating location when compared to the wheelchair accessible seating location 500. In these embodiments, the mechanical springs from among the mechanical springs 710.1.1 through 710.m.n are typically more economical to procure than the haptic devices 506.1.1 through 506.m.n. In some embodiments, the mechanical springs 710.1.1 through 710.m.n can include compression springs, extension springs, torsion springs, and/or constant force springs to provide some examples. In some embodiments, the mechanical springs 710.1.1 through 710.m.n can provide stability to the moveable platform 504 by reducing the tilting and/or rolling of the along the one or more principal axes, for example, along the x-axis and/or the y-axis of the Cartesian coordinate system, as the haptic devices 506.1.1 through 506.m.n move the moveable platform 704 along one or more the principal axes, for example, along the z-axis of the Cartesian coordinate system in a substantially similar manner as described above.

Exemplary Moveable Platforms that can be Implemented within the Exemplary Wheelchair Accessible Seating Locations FIG. 8 graphically illustrates a second exploded view of the exemplary wheelchair accessible seating locations in accordance with some exemplary embodiments of the present disclosure. Specifically, FIG. 8 illustrates a bottom-up exploded view of a wheelchair accessible seating location 800 having the flexible gasket 516, a stationary platform 802, and a moveable platform 804. Although not illustrated in FIG. 8, the wheelchair accessible seating location 800 can include a moveable door, such as the moveable door 208 as described above in FIG. 2A. The wheelchair accessible seating location 800 can represent an exemplary embodiment of the wheelchair accessible seating location 200 as described above in FIG. 2A.

In the exemplary embodiment illustrated in FIG. 8, the stationary platform 802 includes haptic devices 806.1.1 through 806.2.n to move the moveable platform 804 along one of the one or more principal axes, such as the x-axis, the y-axis, and/or the z-axis of the Cartesian coordinate system to provide some examples, in a substantially similar manner as described above. In some embodiments, the haptic devices 806.1.1 through 806.2.n can oscillate the moveable platform 804 along the one or more principal axes to generate vibrations in a substantially similar manner as described above. As illustrated in FIG. 8, the haptic devices 806.1.1 through 806.2.n can be arranged into an array of haptic devices having two (2) columns and n-rows. As illustrated in FIG. 8, two (2) columns can be arranged along a periphery, or border, of the stationary mechanical base 808.

In the exemplary embodiment illustrated in FIG. 8, the moveable platform 804 can be moved along the one or more principal axes, such as the x-axis, the y-axis, and/or the z-axis of the Cartesian coordinate system to provide some examples, in a substantially similar manner as described above. In some embodiments, the moveable platform 804 can oscillate along the one or more principal axes to generate the vibrations in a substantially similar manner as described above. In the exemplary embodiment illustrated in FIG. 8, the moveable platform 804 can a first hollow cavity 810.1 and a second hollow cavity 810.2 to accommodate the haptic devices 806.1.1 through 806.2.n. In some embodiments, the haptic devices 806.1.1 through 806.2.n can be situated within the first hollow cavity 810.1 and the second hollow cavity 810.2. In the exemplary embodiment illustrated in FIG. 8, the first hollow cavity 810.1 and a second hollow cavity 810.2 can correspond to the two (2) columns of the haptic devices 806.1.1 through 806.2.n. In this exemplary embodiment, the haptic devices 806.1.1 through 806.2.n can be situated with the first hollow cavity 810.1 and/or the second hollow cavity 810.2. As illustrated in FIG. 8, the first hollow cavity 810.1 and/or the second hollow cavity 810.2 can be characterized as having a length l, a width w, and a depth d along the one or more principal axes, for example, a length l along the x-axis, a width w along the y-axis, and a depth d along the z-axis. In some embodiments, the length l and/or the width w of the first hollow cavity 810.1 and/or the second hollow cavity 810.2 is to provide sufficient clearance between the haptic devices 806.1.1 through 806.2.n and the first hollow cavity 810.1 and/or the second hollow cavity 810.2 to allow the moveable platform 804 to be moved in a substantially similar manner as described above. In these embodiments, this sufficient clearance can allow the moveable platform 804 to be moved without contacting, for example, rubbing against, the haptic devices 806.1.1 through 806.2.*n*. In these embodiments, the length l and/or the width w of the first hollow cavity 810.1 and/or the second hollow cavity 810.2 can be based upon mechanical housings, such as the mechanical housing 610 as described above in FIG. 6A through FIG. 6D, of the haptic devices 806.1.1 through 806.2.*n*. In some embodiments, the depth d of the first hollow cavity 810.1 and/or the second hollow cavity 810.2 is sufficient to allow the haptic devices 806.1.1 through 806.2.*n* to be situated within the moveable platform 804. In these embodiments, the depth d can be sufficient to allow the haptic devices 806.1.1 through 806.2.*n* to connect to the stationary platform 802 and/or the moveable platform 804. In these embodiments, the depth d can be sufficient to allow the haptic devices 806.1.1 through 806.2.*n* to connect to the stationary platform 802 and/or the moveable platform 804 while the haptic devices 806.1.1 through 806.2.*n* are extended at minimum distances, such as the first distance D1 as described above in FIG. 6A through FIG. 6D, from their corresponding mechanical housings.

FIG. 9A and FIG. 9B graphically illustrate simplified exemplary moveable platforms in accordance with some exemplary embodiments of the present disclosure. Specifically, FIG. 9A illustrates an exploded view of a moveable platform 900 having a moveable base 902, first sidewalls 904.1 and 904.2, and a second sidewall 906. The moveable platform 900 can represent an exemplary embodiment of the moveable platform 202 as described above in FIG. 2A.

In some embodiments, the moveable base 902 can be constructed using a sheet material that can be pressed into one or more U-shapes and/or channel shapes. In these embodiments, the planar sheet material can be pressed using, for example, a machine press and/or a stamping press, to form the moveable base 902 as illustrated in FIG. 9A. Alternatively, or in addition to, the moveable base 902 can be constructed using multiple planar sheet materials that are connected to one another using a fabrication process, such as welding to provide an example, to form the moveable base 902 as illustrated in FIG. 9A. In some embodiments, the planar sheet material can be constructed using the one or more metallic elements, the one or more metallic compounds, the one or more metallic mixtures, and/or the any other suitable metallic material as described above. Alternatively, or in addition to, as illustrated in FIG. 9B, the moveable base 902 can include an outer shell 910 that is mechanically connected to a mechanical skeleton 912. In some embodiments, the outer shell 910 can be constructed using the one or more synthetic or semi-synthetic organic compounds or materials, the one or more organic materials, and/or the other suitable non-metallic material as described above. In some embodiments, the mechanical skeleton 912 can be constructed using one or more structural materials, such as one or more I-beams, one or more Z-Shapes, one or more HSS-Shapes, one or more angles, one or more structural channels, one or more tees, one or more rail profiles, one or more bars, and/or one or more rods, that are connected to one another using a fabrication process, such as welding to provide an example, to form the mechanical skeleton 912 as illustrated in FIG. 9B. In some embodiments, the moveable base 902 can include diamond plating or other similar non-slip flooring products and/or coatings that will be apparent to those skilled in the relevant art(s) without departing from the spirit and scope of the present disclosure to provide some examples to provide the slip-resistant surface to be ADA-compliant.

As illustrated in FIG. 9A, the first sidewalls 904.1 and 904.2 and/or the second sidewall 906 can be mechanically connected to the moveable base 902. In some embodiments, the first sidewalls 904.1 and 904.2 the second sidewall 906 can be mechanically connected to the moveable base 902 using the one or more mechanical fasteners as described above. In some embodiments, the first sidewalls 904.1 and 904.2 and/or the second sidewall 906 can be mechanically connected to the moveable base 902 using a fabrication process, such as welding to provide an example. In some embodiments, the first sidewalls 904.1 and 904.2 and/or the second sidewall 906 can be constructed using the one or more metallic elements, the one or more metallic compounds, the one or more metallic mixtures, and/or the any other suitable metallic material as described above. In some embodiments, the first sidewalls 904.1 and 904.2 and/or the second sidewall 906 can be constructed using the one or more synthetic or semi-synthetic organic compounds or materials, the one or more organic materials, and/or the other suitable non-metallic material as described above.

Exemplary Operation of the Exemplary Wheelchair Accessible Seating Locations

FIG. 10 graphically illustrates a simplified block diagram of an exemplary system for operating the exemplary wheelchair accessible seating locations that can be implemented within the exemplary venue in accordance with some exemplary embodiments of the present disclosure. As described above, a venue, such as the venue 100 to provide an example, represents a location for hosting an event. For example, the event can represent a musical event, a theatrical event, a sporting event, a motion picture, and/or any other suitable event that will be apparent to those skilled in the relevant art(s) without departing the spirit and scope of the present disclosure. And as described above, the venue can include wheelchair accessible seating locations, such as the wheelchair accessible seating locations 108.1 through 108.*g* as described above in FIG. 1 and/or the wheelchair accessible seating location 200 as described above in FIG. 2A to provide some examples, to allow people using wheelchairs, such as the wheelchair 206 as described above in FIG. 2, to view the event. The discussion of FIG. 10 to follow is to describe an exemplary event system 1000 to cause wheelchair accessible seating locations to move in a substantially similar manner as described above as the people using the wheelchairs are viewing the event. In the exemplary embodiment illustrated in FIG. 10, the exemplary event system 1000 can include an event server 1002, a video system 1004, a sound system 1006, an audio crossover system 1008, and wheelchair accessible seating locations 1010.

In the exemplary embodiment illustrated in FIG. 10, the event server 1002 represents one or more computer systems, an exemplary embodiment of which is to be described in further detail below, which facilitate operation of the venue. In some embodiments, the event server 1002 can be implemented in hardware, firmware, software, or any combination thereof. Further, firmware, software, routines, instructions, and/or applications can be described herein as performing certain actions. However, it should be appreciated that such descriptions are merely for convenience and that these actions result from computing devices, processors, controllers, or other devices executing the firmware, software, routines, instructions, and/or applications. As illustrated in FIG. 10, the event server 1002 can deliver an image or a series of images, also referred to as video, and/or sound related to the event to the video system 1004 and/or to the sound system 1006 for presentation to an audience within the venue.

In the exemplary embodiment illustrated in FIG. 10, the video system 1004 can present the image or the video that are received from the event server 1002 to the audience within the venue. In some embodiments, the video system 1004 can include one or more visual displays, such as one or more flat-panel devices, such as one or more liquid crystal displays (LCDs), one or more light-emitting diode (LED) displays, one or more organic light-emitting diode (OLED) displays, and/or one or more quantum dots (QDs) displays to provide some examples, one or more projection devices, and/or any other suitable electrical, mechanical, and/or electro-mechanical device for presenting the image or the video that will be apparent to those skilled in the relevant art(s) without departing the spirit and scope of the present disclosure.

In the exemplary embodiment illustrated in FIG. 10, the sound system 1006 can present the sound received from the event server 1002 to the audience within the venue. Generally, the sound system 1006 can include one or more auditory speakers, such as one or more super tweeters, one or more tweeters, one or more mid-range speakers, one or more woofers, one or more subwoofers, and/or one or more full-range speakers to provide some examples. In the exemplary embodiment illustrated in FIG. 10, the sound system 1006 can include one or more super tweeters/tweeters 1012, one or more mid-range speakers 1014, one or more woofers/subwoofers 1016 to provide some examples. The one or more super tweeters/tweeters 1012 deliver sound within a first audio frequency range between approximately two (2) kilohertz (kHz) and approximately twenty (20) kHz. The one or more mid-range speakers 1014 deliver sound within a second audio frequency range between approximately two hundred fifty (250) Hertz (Hz) and approximately two (2) kHz. The one or more woofers/subwoofers 1016 deliver sound within a third audio frequency range between approximately twenty (20) Hz and approximately two hundred fifty (250) Hz.

The audio crossover system 1008 separates, or parses, the sound from the event server 1002 into the first audio frequency range, the second audio frequency range, and the third audio frequency range. In some embodiments, the audio crossover system 1008 can include multiple filters to parse the sound into the first audio frequency range, the second audio frequency range, and the third audio frequency range. In some embodiments, the audio crossover system 1008 can be integrated within the event server 1002. As illustrated in FIG. 10, the audio crossover system 1008 delivers the sound within the first audio frequency range to the one or more super tweeters/tweeters 1012, the sound within the second audio frequency range to the one or more mid-range speakers 1014, and the sound within the third audio frequency range to the one or more woofers/subwoofers 1016 and the wheelchair accessible seating locations 1010.

The wheelchair accessible seating locations 1010 can be moved along one or more principal axes, such as the x-axis, the y-axis, and/or the z-axis of the Cartesian coordinate system to provide some examples, as the people in the wheelchairs are viewing the event in a substantially similar manner as described above. For example, the wheelchair accessible seating locations 1010 can be moved along the x-axis of the Cartesian coordinate system to pitch the wheelchair accessible seating locations 1010. As another example, the wheelchair accessible seating locations 1010 can be moved along the y-axis of the Cartesian coordinate system to roll the wheelchair accessible seating locations 1010. In some embodiments, the wheelchair accessible seating locations 1010 can oscillate along the one or more principal axes to generate vibrations to create the experience of touch to the people using the wheelchairs. In these embodiments, these movement of the wheelchair accessible seating locations 1010 can coincide with, for example, be synchronized to, the sound within the third audio frequency range to provide the people using the wheelchairs with a substantially similar immersive experience as other spectators of the event that are seated in the seats within the venue.

Exemplary Computer System that can be Utilized to Implement Electronic Devices within the Exemplary Venue FIG. 11 graphically illustrates a simplified block diagram of a computer system suitable for use with embodiments described herein according to some exemplary embodiments of the present disclosure. The various electronic devices, for example, the event server 1002 as described above in FIG. 10, can be implemented in hardware, firmware, software, or any combination thereof. The discussion of FIG. 11 to follow describes an exemplary computer system 1110 that can be used for these electronic devices.

In the exemplary embodiment illustrated in FIG. 11, the computer system 1110 typically includes at least one processor 1114 which communicates with a number of peripheral devices via bus subsystem 1112. Typically, the at least processor 1114 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 11, these peripheral devices may include a storage subsystem 1124, comprising a memory subsystem 1126 and a file storage subsystem 1128, user interface input devices 1122, user interface output devices 1120, and a network interface subsystem 1116. The input and output devices allow user interaction with computer system 1110. In the exemplary embodiment illustrated in FIG. 11, the network interface subsystem 1116 provides an interface to outside networks, including an interface to a communication network 1118, and is coupled via a communication network 1118 to corresponding interface devices in other computer systems or machines. The communication network 1118 may comprise many interconnected computer systems, machines and communication links. These communication links may be wired links, optical links, wireless links, or any other devices for communication of information. The communication network 1118 can be any suitable computer network, for example a wide area network such as the Internet, and/or a local area network such as Ethernet. The communication network 1118 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 1122 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into the computer system 1110 or onto the communication network 1118. The user interface input devices 1122 typically allow a user to select objects, icons, text and the like that appear on some types of user interface output devices, for example, a display subsystem.

The user interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 1110 to the user or to another machine or computer system.

The memory subsystem 1126 typically includes a number of memories including a main random-access memory ("RAM") 1130 (or other volatile storage device) for storage of instructions and data during program execution and a read only memory ("ROM") 1132 in which fixed instructions are stored. The file storage subsystem 1128 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 1128.

The bus subsystem 1112 provides a device for letting the various components and subsystems of the computer system 1110 communicate with each other as intended. Although the bus subsystem 1112 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A system for operating a wheelchair accessible seating location within a venue, the system comprising:
   an event server configured to deliver video and sound related to an event being presented within the venue; and
   an audio crossover system configured to:
      separate the sound into a plurality of audio frequency ranges, and
      deliver sound within a lowest range of audio frequencies from among the plurality of audio frequency ranges to the wheelchair accessible seating location to cause the wheelchair accessible seating location to move in synchronicity with the sound within the lowest range of audio frequencies along one or more principal axes from among a plurality of principal axes.

2. The system of claim 1, wherein the event server is configured to deliver the video to one or more visual displays for presentation to an audience within the venue, and
   wherein the audio crossover system is further configured to deliver the sound to a speaker system for presentation to the audience within the venue.

3. The system of claim 2, wherein the audio crossover system is further configured to deliver sound within a highest range of audio frequencies from among the plurality of audio frequency ranges to one or more super tweeters or tweeters of the speaker system, sound within a middle range of audio frequencies from among the plurality of audio frequency ranges to one or more mid-range speakers of the speaker system, and the sound within the lowest range of audio frequencies to one or more woofers or subwoofers of the speaker system.

4. The system of claim 1, wherein the sound within the lowest range of audio frequencies is less than approximately two hundred fifty Hertz (Hz).

5. The system of claim 1, wherein the plurality of principal axes comprise an x-axis of the Cartesian coordinate system, a y-axis of the Cartesian coordinate system, and a z-axis of the Cartesian coordinate system.

6. The system of claim 5, wherein the audio crossover system is configured to deliver the sound within the lowest range of audio frequencies to the wheelchair accessible seating location to cause the wheelchair accessible seating location to move in synchronicity with the sound within the lowest range of audio frequencies along the z-axis of the Cartesian coordinate system.

7. The system of claim 1, wherein the audio crossover system is configured to deliver the sound within the lowest range of audio frequencies to the wheelchair accessible seating location to cause a moveable platform of the wheelchair accessible seating location that is configured to accommodate a person using a wheelchair to move in relation to a stationary platform of the wheelchair accessible seating location that is attached to the venue.

8. The system of claim 7, wherein the audio crossover system is configured to deliver the sound within the lowest range of audio frequencies to the wheelchair accessible seating location to cause a plurality of haptic devices of the wheelchair accessible seating location to move the moveable platform in relation to the stationary platform.

9. A method for operating a wheelchair accessible seating location within a venue, the method comprising:
   delivering, by one or more computer systems, video related to an event to one or more visual displays within the venue for presentation to an audience within the venue;
   separating, by the one or more computer systems, sound related to the event into a plurality of audio frequency ranges;
   delivering, by the one or more computer systems, sound within the plurality of audio frequency ranges to one or more auditory speakers within the venue for presentation to the audience; and
   delivering, by the one or more computer systems, sound within a lowest range of audio frequencies from among the plurality of audio frequency ranges to the wheelchair accessible seating location to cause the wheelchair accessible seating location to move in synchronicity with the sound within the lowest range of audio frequencies along one or more principal axes from among a plurality of principal axes.

10. The method of claim 9, wherein the delivering the sound within the lowest range of audio frequencies comprises delivering the sound within the lowest range of audio frequencies to the wheelchair accessible seating location to cause the wheelchair accessible seating location to move in synchronicity with the sound within the lowest range of audio frequencies to provide audience members seated in the wheelchair accessible seating location with a substantially similar immersive experience as other audience members seated in seats within the venue.

11. The method of claim 9, wherein the separating comprises separating the sound into a highest range of audio frequencies from among the plurality of audio frequency ranges, a middle range of audio frequencies from among the plurality of audio frequency ranges, and the lowest range of audio frequencies.

12. The method of claim 11, wherein the highest range of audio frequencies is greater than approximately two kilohertz (kHz),
   wherein the middle range of audio frequencies is between approximately two hundred fifty Hertz (Hz) and approximately two kHz, and
   wherein the lowest range of audio frequencies is less than approximately two hundred fifty Hz.

13. The method of claim 9, wherein the plurality of principal axes comprise an x-axis of the Cartesian coordinate system, a y-axis of the Cartesian coordinate system, and a z-axis of the Cartesian coordinate system.

14. The method of claim 13, wherein the delivering the sound within the lowest range of audio frequencies comprises delivering the sound within the lowest range of audio frequencies to the wheelchair accessible seating location to cause the wheelchair accessible seating location to move in synchronicity with the sound within the lowest range of audio frequencies along the z-axis of the Cartesian coordinate system.

15. The method of claim 9, wherein the delivering the sound within the lowest range of audio frequencies comprises delivering the sound within the lowest range of audio frequencies to the wheelchair accessible seating location to cause a moveable platform of the wheelchair accessible seating location that is configured to accommodate a person using a wheelchair to move in relation to a stationary platform of the wheelchair accessible seating location that is attached to the venue.

16. The method of claim 15, wherein the delivering the sound within the lowest range of audio frequencies comprises delivering the sound within the lowest range of audio frequencies to the wheelchair accessible seating location to cause a plurality of haptic devices of the wheelchair accessible seating location to move the moveable platform in relation to the stationary platform.

17. A venue for presenting an event to an audience within the venue, the venue comprising:
   one or more computer systems configured to:
      deliver video and sound related to the event being presented within the venue, and
      separate the sound into a plurality of audio frequency ranges; and
   a wheelchair accessible seating location having a plurality of haptic devices, a moveable platform of the wheelchair accessible seating location that is configured to accommodate a person using a wheelchair, a stationary platform of the wheelchair accessible seating location that is attached to the venue, the plurality of haptic devices being configured to move the moveable platform in relation to the stationary platform in synchronicity with sound within a lowest range of audio frequencies from among the plurality of audio frequency ranges along one or more principal axes from among a plurality of principal axes.

18. The venue of claim 17, wherein the one or more computer systems are configured to separate the sound into a highest range of audio frequencies from among the plurality of audio frequency ranges, a middle range of audio frequencies from among the plurality of audio frequency ranges, and the lowest range of audio frequencies.

19. The venue of claim 18, wherein the highest range of audio frequencies is greater than approximately two kilohertz (kHz),
   wherein the middle range of audio frequencies is between approximately two hundred fifty Hertz (Hz) and approximately two kHz, and
   wherein the lowest range of audio frequencies is less than approximately two hundred fifty Hz.

20. The venue of claim 17, wherein the plurality of haptic devices is configured to move the moveable platform in relation to the stationary platform in synchronicity with the sound within the lowest range of audio frequencies along an x-axis of the Cartesian coordinate system, a y-axis of the Cartesian coordinate system, or a z-axis of the Cartesian coordinate system.

* * * * *